United States Patent
Zhang et al.

(10) Patent No.: US 11,962,344 B2
(45) Date of Patent: Apr. 16, 2024

(54) METHOD AND APPARATUS FOR OBTAINING TRANSMITTER TEST PARAMETER, AND STORAGE MEDIUM

(71) Applicant: Huawei Technologies Co., Ltd., Shenzhen (CN)

(72) Inventors: Kuo Zhang, Dongguan (CN); Lei Zhou, Shenzhen (CN); Borui Li, Wuhan (CN); Shengping Li, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

(21) Appl. No.: 17/682,836

(22) Filed: Feb. 28, 2022

(65) Prior Publication Data
US 2022/0182139 A1 Jun. 9, 2022

Related U.S. Application Data

(63) Continuation of application No. PCT/CN2020/077530, filed on Mar. 3, 2020.

(30) Foreign Application Priority Data

Aug. 31, 2019 (CN) .......................... 201910819211.0

(51) Int. Cl.
*H04B 10/079* (2013.01)
(52) U.S. Cl.
CPC ................................ *H04B 10/0795* (2013.01)
(58) Field of Classification Search
None
See application file for complete search history.

(56) References Cited

U.S. PATENT DOCUMENTS

| 10,720,995 | B1 * | 7/2020 | Mazzini | .............. | H04L 25/4917 |
| 2015/0304025 | A1 | 10/2015 | Liu et al. | | |
| 2015/0318919 | A1 * | 11/2015 | Dawe | ........................ | H04L 1/20 398/16 |

FOREIGN PATENT DOCUMENTS

| CN | 101496318 A | 7/2009 |
| CN | 102714544 A | 10/2012 |

(Continued)

OTHER PUBLICATIONS

Cheverri-Chacon et al., "Transmitter and Dispersion Eye Closure Quaternary (TDECQ) and its Sensitivity to Impairments in PAM4 Waveforms," Journal of Lightwave Technology, vol. 37, No. 3, pp. 852-860,Institute of Electrical and Electronics Engineers, New York, New York, Feb. 1, 2019 (Year: 2019).*

(Continued)

*Primary Examiner* — Li Liu
(74) *Attorney, Agent, or Firm* — Leydig, Voit & Mayer, Ltd.

(57) ABSTRACT

Embodiments of this application provide a method and an apparatus for obtaining a transmitter test parameter, and a storage medium. The method includes: performing waveform sampling on an optical signal sent by a transmitter, to obtain a sampled electrical signal, obtaining a first noise amount associated with the sampled electrical signal based on a preset initial noise ratio parameter and a level amplitude of the sampled electrical signal, and obtaining a second noise amount associated with an ideal electrical signal based on the initial noise ratio parameter and a level amplitude of the ideal electrical signal. According to the application, a noise amount associated with a level amplitude of a sampled electrical signal is obtained without limiting a type of a receiver that performs a consistency test on a transmitter by using a transmitter test parameter.

20 Claims, 7 Drawing Sheets

(56) References Cited

FOREIGN PATENT DOCUMENTS

| | | |
|---|---|---|
| CN | 102904635 A | 1/2013 |
| CN | 104133224 A | 11/2014 |
| CN | 107342781 A | 11/2017 |
| CN | 107800474 A | 3/2018 |
| CN | 110417463 A | 11/2019 |
| JP | 2008526121 A | 7/2008 |
| JP | 2013038815 A | 2/2013 |

OTHER PUBLICATIONS

Echeverri-Chacón et al., "Transmitter and Dispersion Eye Closure Quaternary (TDECQ) and its Sensitivity to Impairments in PAM4 Waveforms," Journal of Lightwave Technology, vol. 37, No. 3, pp. 852-860, Institute of Electrical and Electronics Engineers, New York, New York (Feb. 1, 2019).

Zhang et al., "Study on the TDEC (transmitter dispersion and eye closure) metric using an EQ-enabled reference receiver for transmitter evaluation in 50G-PON," Total 5 pages, Texas, USA (Jan. 2019).

Zhu Meidong et al., "System Analysis of PAM4 Technology in Optical Communication Applications," ZTE Technology Journal, vol. 24, No. 4, pp. 33-37, Nanjing, China (Aug. 2018). With English Abstract.

\* cited by examiner

METHOD AND APPARATUS FOR OBTAINING TRANSMITTER TEST PARAMETER, AND STORAGE MEDIUM

CROSS-REFERENCE TO RELATED APPLICATIONS

This application is a continuation of International Application No. PCT/CN2020/077530, filed on Mar. 3, 2020, which claims priority to Chinese Patent Application No. 201910819211.0, filed on Aug. 31, 2019. The disclosures of the aforementioned applications are hereby incorporated by reference in their entireties.

TECHNICAL FIELD

Embodiments of this application relate to the field of optical communication technologies, and in particular, to a method and an apparatus for obtaining a transmitter test parameter, and a storage medium.

BACKGROUND

In an optical communication network, to implement communication between one receiver and different types of transmitters, the receiver needs to perform a consistency test on different types of transmitters. Currently, a method for performing a consistency test on a transmitter mainly includes an eye mask, a transmitter and dispersion penalty (TDP), and a transmitter and dispersion eye closure penalty (TDEC).

When a consistency test is performed on a transmitter, a transmitter test parameter may be obtained by using the following solution: First, an oscilloscope is used to perform waveform sampling on an optical signal sent by the transmitter, to obtain a sampled electrical signal. Then, a noise amount corresponding to the sampled electrical signal is obtained. A same noise amount is obtained regardless of whether a level of the sampled electrical signal is 1 or 0. The noise amount corresponding to the sampled electrical signal is used as the transmitter test parameter, to evaluate a noise tolerance capability of the receiver.

In the solution for obtaining a transmitter test parameter, all sampled electrical signals correspond to a same noise amount. This solution is generally applicable only to a PIN receiver, but is not applicable to an avalanche photodiode (APD) receiver. A reason is as follows: Due to an impact of shot noise on the APD receiver, noise amounts corresponding to sampled electrical signals at different amplitudes are different. For example, a signal at a level 1 requires more noise than a signal at a level 0. Because all sampled electrical signals correspond to a same noise amount, based on the foregoing solution for obtaining a transmitter test parameter, the APD receiver can only use a same noise amount as the transmitter test parameter. Consequently, a transmitter consistency test result cannot reflect actual performance of the transmitter. The foregoing solution for obtaining a transmitter test parameter is applicable only to the PIN receiver. Therefore, a type of a receiver to which the current solution is applicable is limited in the current solution.

SUMMARY

Embodiments of this application provide a method and an apparatus for obtaining a transmitter test parameter, and a storage medium, to obtain a noise amount corresponding to a level amplitude of a sampled electrical signal, without limiting a type of a receiver that performs a consistency test on a transmitter by using a transmitter test parameter.

To resolve the foregoing technical problem, the embodiments of this application provide the following technical solutions.

According to a first aspect, an embodiment of this application provides a method for obtaining a transmitter test parameter, including: performing waveform sampling on an optical signal sent by a transmitter, to obtain a sampled electrical signal; obtaining a first noise amount corresponding to the sampled electrical signal based on a preset initial noise ratio parameter and a level amplitude of the sampled electrical signal, where the level amplitude of the sampled electrical signal is greater than a minimum level and less than a maximum level, the initial noise ratio parameter is a ratio of a maximum noise amount to a minimum noise amount, the maximum noise amount is a noise amount corresponding to an electrical signal at the maximum level, the minimum noise amount is a noise amount corresponding to an electrical signal at the minimum level, and the first noise amount is a noise amount that is greater than the minimum noise amount and less than the maximum noise amount; and obtaining a second noise amount corresponding to an ideal electrical signal based on the initial noise ratio parameter and a level amplitude of the ideal electrical signal, where the ideal electrical signal has a same optical modulation amplitude as the sampled electrical signal, and the level amplitude of the ideal electrical signal is the maximum level or the minimum level, where the first noise amount and the second noise amount are used to perform a consistency test on the transmitter. In this solution, in this embodiment of this application, the first noise amount corresponding to the sampled electrical signal may be obtained based on the preset initial noise ratio parameter and the level amplitude of the sampled electrical signal, and the determined first noise amount is a noise amount that is greater than the minimum noise amount and less than the maximum noise amount. Therefore, in this embodiment of this application, noise amounts corresponding to sampled electrical signals at different level amplitudes are different, that is, a noise amount corresponding to the level amplitude of the sampled electrical signal may be obtained. Therefore, this solution is applicable to different types of receivers. A type of a receiver that performs a consistency test on a transmitter by using a transmitter test parameter is not limited in this embodiment of this application.

In some embodiments of this application, the obtaining a first noise amount corresponding to the sampled electrical signal based on a preset initial noise ratio parameter and a level amplitude of the sampled electrical signal includes: determining that the level amplitude of the sampled electrical signal is between the maximum level and the minimum level; and using the maximum noise amount and the minimum noise amount as an interpolation condition, and performing interpolation calculation on the level amplitude of the sampled electrical signal based on the initial noise ratio parameter, to obtain the first noise amount. In this solution, after the level amplitude of the sampled electrical signal is obtained, it is determined whether the level amplitude of the sampled electrical signal is between the maximum level and the minimum level. For example, if the maximum level is 1 and the minimum level is 0, the level amplitude of the sampled electrical signal may be 0.8, 0.9, 0.6, or the like. The maximum noise amount and the minimum noise amount are used as the interpolation condition, that is, the maximum noise amount and the minimum noise amount are used as two endpoint values of an interpolation algorithm, and interpolation calculation is performed on the level amplitude of the sampled electrical signal based on the initial noise ratio parameter, to obtain the first noise amount. A larger level amplitude of the sampled electrical signal indicates a larger first noise amount corresponding to the sampled electrical signal. A smaller level amplitude of the sampled electrical signal indicates a smaller first noise amount corresponding to the sampled electrical signal. The interpolation algorithm is an algorithm used to calculate a result by using an interpolation function when the maximum noise amount and the minimum noise amount are known. A plurality of interpolation algorithms may be used in this embodiment of this application. For example, the interpolation algorithm may be linear interpolation, nearest-neighbor interpolation, or bilinear interpolation.

In some embodiments of this application, the using the maximum noise amount and the minimum noise amount as an interpolation condition, and performing interpolation calculation on the level amplitude of the sampled electrical signal based on the initial noise ratio parameter, to obtain the first noise amount includes: obtaining a tolerable-noise amount $\sigma_G$ of the sampled electrical signal at a preset sampling point; determining maximum noise $\sigma_{max}$ corresponding to the electrical signal at the maximum level in the following manner: $\sigma_{max}=M\sigma_G$, where M represents the initial noise ratio parameter; determining the minimum noise amount corresponding to the electrical signal at the minimum level is $\sigma_G$; performing quantization between the maximum level and the minimum level to obtain N level values, where the N level values are all between the maximum level and the minimum level, and N is a positive integer; calculating N noise amounts respectively corresponding to the N level values according to a preset interpolation algorithm; determining that the level amplitude of the sampled electrical signal is a first level value in the N level values; and obtaining a first noise amount corresponding to the first level value based on a correspondence between the N level values and the N noise amounts. In this solution, level amplitude quantization is performed based on the maximum level and the minimum level, to obtain the N level values through quantization between the maximum level and the minimum level. The N noise amounts respectively corresponding to the N level values are calculated according to the preset interpolation algorithm, that is, one noise amount is calculated according to the interpolation algorithm for each of the N level values obtained through quantization. In this case, the N noise amounts may be calculated for the N level values. For example, the correspondence between a level amplitude and a noise amount may include the N noise amounts respectively corresponding to the N level values. If it is determined that the level amplitude of the sampled electrical signal is the first level value in the N level values, the first level value is a level value in the N level values. Finally, the first noise amount corresponding to the first level value is obtained based on the correspondence between the N level values and the N noise amounts. In this embodiment of this application, it is determined that the level amplitude of the sampled electrical signal is the first level value in the N level values, and the correspondence between the N level values and the N noise amounts is searched by using the first level value, to determine the first noise amount corresponding to the sampled electrical signal. In this embodiment of this application, different noise amounts may be determined for different level amplitudes of the sampled electrical signal. This embodiment of this application provides a solution for obtaining fine noise amounts corresponding to different level amplitudes of the sampled electrical signal. Therefore, in this embodiment of this application, actual optical power attenuation of different optical signals transmitted by the transmitter may be simulated, to reflect actual performance of the transmitter. In this embodiment of this application, noise amounts corresponding to sampled electrical signals at different level amplitudes are different, that is, the noise amount corresponding to the level amplitude of the sampled electrical signal may be obtained. Therefore, this solution is applicable to different types of receivers. A type of a receiver that performs a consistency test on a transmitter by using a transmitter test parameter is not limited in this embodiment of this application.

In some embodiments of this application, the obtaining a first noise amount corresponding to the sampled electrical signal based on a preset initial noise ratio parameter and a level amplitude of the sampled electrical signal includes: obtaining a correspondence between a level amplitude and a noise amount based on the preset initial noise ratio parameter, the maximum noise amount, and the minimum noise amount, where the correspondence between a level amplitude and a noise amount includes a noise amount corresponding to each level amplitude that is greater than the minimum level and less than the maximum level; and searching the correspondence between a level amplitude and a noise amount by using the level amplitude of the sampled electrical signal, to obtain the first noise amount. In this embodiment of this application, the correspondence between a level amplitude and a noise amount may be pre-established based on the initial noise ratio parameter, the maximum noise amount, and the minimum noise amount. For example, the correspondence between a level amplitude and a noise amount includes the maximum noise amount corresponding to the electrical signal at the maximum level and the minimum noise amount corresponding to the electrical signal at the minimum level. The correspondence between a level amplitude and a noise amount further includes a noise amount corresponding to an electrical signal at a level between the maximum level and the minimum level. In other words, the correspondence may include noise amounts respectively corresponding to all level amplitudes. For example, the correspondence may be a table or a set. For example, the table includes different noise amounts respectively corresponding to all level amplitudes. After the level amplitude of the sampled electrical signal is obtained, the noise amount corresponding to the level amplitude of the sampled electrical signal may be determined by searching the correspondence. In this case, the noise amount obtained by searching the correspondence is the first noise amount corresponding to the sampled electrical signal.

In this solution, a correspondence between level amplitudes and noise amounts at consecutive sampling points is a correspondence between level amplitudes at a plurality of consecutive sampling points and values of noise amounts. For example, the correspondence may be a table or a set. For example, the correspondence may include noise amounts corresponding to level amplitudes at P consecutive sampling points. After the level amplitude of the sampled electrical signal is obtained, different noise amounts corresponding to level amplitudes at different consecutive sampling point may be determined by searching the correspondence. After the correspondence between level amplitudes and noise amounts at consecutive sampling points is established, a third noise amount corresponding to the electrical signal at the maximum level and a fourth noise amount corresponding to the electrical signal at the minimum level may be determined by searching the correspondence. After the sampled electrical signal is further processed by an equalizer, an equalized electrical signal is output. Due to a time-domain convolution function of the equalizer, noise corresponding to the maximum level and the minimum level is averaged, and a ratio of the maximum noise amount to the minimum noise amount is less than the foregoing initial noise ratio parameter M. Therefore, after the sampled electrical signal is processed by the equalizer, the foregoing initial noise ratio parameter needs to be modified based on an equalization parameter, that is, the initial noise ratio parameter is modified based on the third noise amount and the fourth noise amount, to obtain a modified noise ratio parameter. The equalizer performs time-domain equalization processing on the sampled electrical signal to obtain an equalized electrical signal. Different equalizers have different noise enhancement degrees. Therefore, a noise enhancement factor may be further obtained based on the equalization parameter, and the noise enhancement factor may be used to measure a noise enhancement degree of a currently used equalizer. A first noise amount corresponding to the equalized electrical signal may be obtained based on the obtained level amplitude of the sampled electrical signal, the modified noise ratio parameter, the noise enhancement factor, and an average optical power. Because the equalization parameter of the equalizer may be used to determine the modified noise ratio parameter and the noise enhancement factor, the level amplitude of the sampled electrical signal, the modified noise ratio parameter, the noise enhancement factor, and the average optical power may be used to obtain the first noise amount corresponding to the equalized electrical signal. The first noise amount corresponding to the equalized electrical signal is used as a transmitter test parameter, so that optical power attenuation of a signal due to noise when an equalizer is used in the receiver can be simulated, to reflect actual performance of the transmitter. In this embodiment of this application, noise amounts corresponding to sampled electrical signals at different level amplitudes are different, that is, the noise amount corresponding to the level amplitude of the sampled electrical signal may be obtained. Therefore, this solution is applicable to different types of receivers. A type of a receiver that performs a consistency test on a transmitter by using a transmitter test parameter is not limited in this embodiment of this application.

In some embodiments of this application, after the performing waveform sampling on an optical signal sent by a transmitter, to obtain a sampled electrical signal, the method further includes: performing time-domain equalization processing on the sampled electrical signal by using an equalizer, to obtain an equalized electrical signal. In this solution, the receiver may further include an equalizer. In this case, the sampled electrical signal is further input to the equalizer. Because the equalizer performs time-domain equalization processing on the sampled electrical signal, the equalized electrical signal is obtained. Due to a time-domain convolution function of the equalizer, noise corresponding to different level amplitudes is averaged. Therefore, the first noise amount needs to be determined again for the equalized electrical signal.

In some embodiments of this application, the obtaining a first noise amount corresponding to the sampled electrical signal based on a preset initial noise ratio parameter and a level amplitude of the sampled electrical signal includes: obtaining an equalization parameter corresponding to the equalizer, where the equalization parameter includes a tap length of the equalizer and a tap coefficient of the equalizer; and obtaining a first noise amount corresponding to the equalized electrical signal based on the level amplitude of the sampled electrical signal, the equalization parameter, and the initial noise ratio parameter. In this solution, the receiver may further include an equalizer. In this case, the sampled electrical signal is further input to the equalizer. Because the equalizer performs time-domain equalization processing on the sampled electrical signal, the equalized electrical signal is obtained, and the equalization parameter corresponding to the equalizer is obtained. Due to the time-domain convolution function of the equalizer, noise corresponding to the maximum level and the minimum level is averaged, and a ratio of the maximum noise amount to the minimum noise amount is less than the foregoing initial noise ratio parameter M. Therefore, after the sampled electrical signal is processed by the equalizer, the first noise amount needs to be obtained again for the equalized electrical signal based on the level amplitude of the sampled electrical signal, the equalization parameter, and the initial noise ratio parameter. The equalization parameter of the equalizer affects the first noise amount corresponding to the equalized electrical signal. Therefore, the first noise amount corresponding to the equalized electrical signal may be obtained, so that optical power attenuation of a signal due to noise when an equalizer is used in the receiver can be simulated, to reflect actual performance of the transmitter.

In some embodiments of this application, the obtaining a first noise amount corresponding to the equalized electrical signal based on the level amplitude of the sampled electrical signal, the equalization parameter, and the initial noise ratio parameter includes: obtaining a correspondence between level amplitudes and noise amounts at consecutive sampling points based on the level amplitude of the sampled electrical signal, the equalization parameter, and the initial noise ratio parameter; determining a third noise amount corresponding to the electrical signal at the maximum level and a fourth noise amount corresponding to the electrical signal at the minimum level based on the correspondence between level amplitudes and noise amounts at consecutive sampling points; modifying the initial noise ratio parameter based on the third noise amount and the fourth noise amount, to obtain a modified noise ratio parameter; obtaining a noise enhancement factor based on the equalization parameter, where the noise enhancement factor is used to represent a noise enhancement degree of the equalizer; and obtaining the first noise amount corresponding to the equalized electrical signal based on the level amplitude of the sampled electrical signal, the modified noise ratio parameter, the noise enhancement factor, and an average optical power, where the average optical power is an average value of optical powers of the sampled electrical signal at different level amplitudes.

In some embodiments of this application, the obtaining the first noise amount corresponding to the equalized electrical signal based on the level amplitude of the sampled electrical signal, the modified noise ratio parameter, the noise enhancement factor, and an average optical power includes: calculating the first noise amount $\sigma_{DUT\_estimated}$ corresponding to the equalized electrical signal in the following manner:

$$\frac{1}{2} \left( \frac{\int f_u(y) \cdot Q\left( \frac{y - P_{th}}{M(y) \cdot C_{eq} \sigma_{DUT\_estimated}} \right) dy}{\int f_u(y) dy} \right) +$$

-continued $$\frac{1}{2}\left(\frac{\int f_l(y) \cdot Q\left(\frac{P_{th} - y}{M(y) \cdot C_{eq}\sigma_{DUT\_estimated}}\right)dy}{\int f_l(y)dy}\right) = BER_{target}$$

where y represents a signal power collected at a sampling point at which the sampled electrical signal is located, $P_{th}$ represents the average optical power, $f_u(y)$ is amplitude distribution at a sampling point at which an optical power is greater than $P_{th}$, $f_l(y)$ is amplitude distribution at a sampling point at which an optical power is less than $P_{th}$, M(y) represents the modified noise ratio parameter, $C_{eq}$ is the noise enhancement factor, $BER_{target}$ is a bit error rate threshold, and Q represents a tail function with standard normal distribution.

In this solution, the foregoing formula may be established by using a Gaussian noise model, bit error determining is performed through forward error correction, a specified bit error rate threshold is represented as $BER_{target}$, the first noise amount $\sigma_{DUT\_estimated}$ corresponding to the equalized electrical signal meets the foregoing formula, and the first noise amount $\sigma_{DUT\_estimated}$ corresponding to the equalized electrical signal may be output by using the foregoing formula. No limitation is imposed. In this embodiment of this application, the foregoing formula for calculating the first noise amount $\sigma_{DUT\_estimated}$ corresponding to the equalized electrical signal may impose no limitation, and the first noise amount $\sigma_{DUT\_estimated}$ may be calculated based on an equivalent variant or equation transformation of the foregoing formula.

In some embodiments of this application, the obtaining a correspondence between level amplitudes and noise amounts at consecutive sampling points based on the equalization parameter includes: determining P consecutive sampling points corresponding to P taps in the equalizer, where a value of P is a positive integer; and calculating, in the following manner, a noise amount $noise_{eq}(n)$ that is at an $n^{th}$ sampling point and that exists after equalization:

$$noise_{eq}(n) = \sqrt{\sum_{m=-\frac{P-1}{2}}^{\frac{P-1}{2}} |noise(n-m) \cdot h_{eq}(m)|^2 + \sum_{\substack{m=-\frac{L-1}{2} \\ m \notin [-\frac{P-1}{2}, \frac{P-1}{2}]}}^{\frac{L-1}{2}} |\sigma_{average} \cdot h_{eq}(m)|^2}$$

where L represents the tap length of the equalizer, $h_{eq}$ represents the tap coefficient of the equalizer, noise(n−m) represents a noise amount that is at an $(n-m)^{th}$ sampling point and that exists before time-domain equalization processing is performed, and $\sigma_{average}$ is an average noise amount at different level amplitudes; and quantizing the level amplitude of the sampled electrical signal to obtain W levels, where W is a positive integer; and obtaining the correspondence between level amplitudes and noise amounts at consecutive sampling points based on the calculation manner of $noise_{eq}(n)$, where the correspondence between level amplitudes and noise amounts at consecutive sampling points includes WP noise amounts corresponding to level amplitudes at the P consecutive sampling points.

In some embodiments of this application, the obtaining a second noise amount corresponding to an ideal electrical signal based on the initial noise ratio parameter and a level amplitude of the ideal electrical signal includes: calculating the second noise amount $\sigma_{ideal_{estimated}}$ corresponding to the ideal electrical signal in the following manner:

$$\frac{1}{2}Q\left(\frac{y - P_{th}}{M \cdot \sigma_{ideal\_estimated}}\right) + \frac{1}{2}Q\left(\frac{P_{th} - y}{\sigma_{ideal\_estimated}}\right) = BER_{target}$$

where y represents a signal power collected at a sampling point at which the ideal electrical signal is located, $P_{th}$ represents an average optical power, the average optical power is an average value of optical powers of the ideal electrical signal at different level amplitudes, M represents the initial noise ratio parameter, $BER_{target}$ is a bit error rate threshold, and Q represents a tail function with standard normal distribution.

In some embodiments of this application, the method further includes: calculating a transmitter and dispersion eye closure penalty by using the first noise amount and the second noise amount.

In some embodiments of this application, the calculating a transmitter and dispersion eye closure penalty by using the first noise amount and the second noise amount includes: calculating the transmitter and dispersion eye closure penalty $TDEC_{calculated}$ in the following manner:

$$TDEC_{calculated} = \frac{\sigma_{DUT}}{\sigma_{ideal}}$$

where $\sigma_{DUT}$ represents the first noise amount, and $\sigma_{ideal}$ represents the second noise amount.

In this solution, the transmitter and dispersion eye closure penalty may be expressed as $TDEC_{calculated}$, the transmitter and dispersion eye closure penalty $TDEC_{calculated}$ may be calculated by using the foregoing formula, and the calculated TDEC result may be used as a transmitter consistency test result. No limitation is imposed. In this embodiment of this application, the foregoing formula for calculating the transmitter and dispersion eye closure penalty $TDEC_{calculated}$ may impose no limitation, and the transmitter and dispersion eye closure penalty $TDEC_{calculated}$ may be calculated based on an equivalent variant or equation transformation of the foregoing formula.

In some embodiments of this application, the method further includes: when the bit error rate threshold is used, obtaining noise amounts respectively corresponding to the sampled electrical signal and the ideal electrical signal; obtaining a modification relationship between a transmitter and dispersion eye closure penalty and a noise amount based on the noise amounts that respectively correspond to the sampled electrical signal and the ideal electrical signal and that are obtained when the bit error rate threshold is used; and modifying the calculated transmitter and dispersion eye closure penalty $TDEC_{calculated}$ in the following manner:

$$TDEC_{actual} = TDEC_{calculated} f(TDEC_{actual}, TDEC_{calculated})$$

where $TDEC_{actual}$ represents a modified transmitter and dispersion eye closure penalty, and $f(TDEC_{actual}, TDEC_{calculated})$ represents the modification relationship between a transmitter and dispersion eye closure penalty and a noise amount.

In this solution, to evaluate an impact on noise distribution, the modification relationship between a transmitter and dispersion eye closure penalty and a noise amount is obtained based on the noise amounts that respectively correspond to the sampled electrical signal and the ideal electrical signal and that are obtained when the bit error rate threshold is used. For example, the modification relationship between a transmitter and dispersion eye closure penalty and a noise amount may be a TDEC modification look-up table, and different modification values are assigned to different transmitter and dispersion eye closure penalties $TDEC_{calculated}$ based on the look-up table. The modified TDEC can be used to simulate optical power attenuation of a signal due to noise when an equalizer is used in the receiver, to reflect actual performance of the transmitter.

According to a second aspect, an embodiment of this application further provides an apparatus for obtaining a transmitter test parameter, including a processing module, configured to perform waveform sampling on an optical signal sent by a transmitter, to obtain a sampled electrical signal, where the processing module is configured to obtain a first noise amount corresponding to the sampled electrical signal based on a preset initial noise ratio parameter and a level amplitude of the sampled electrical signal, where the level amplitude of the sampled electrical signal is greater than a minimum level and less than a maximum level, the initial noise ratio parameter is a ratio of a maximum noise amount to a minimum noise amount, the maximum noise amount is a noise amount corresponding to an electrical signal at the maximum level, the minimum noise amount is a noise amount corresponding to an electrical signal at the minimum level, and the first noise amount is a noise amount that is greater than the minimum noise amount and less than the maximum noise amount; and the processing module is configured to obtain a second noise amount corresponding to an ideal electrical signal based on the initial noise ratio parameter and a level amplitude of the ideal electrical signal, where the ideal electrical signal has a same optical modulation amplitude as the sampled electrical signal, and the level amplitude of the ideal electrical signal is the maximum level or the minimum level, where the first noise amount and the second noise amount are used to perform a consistency test on the transmitter.

In some embodiments of this application, the processing module is further configured to: determine that the level amplitude of the sampled electrical signal is between the maximum level and the minimum level; and use the maximum noise amount and the minimum noise amount as an interpolation condition, and perform interpolation calculation on the level amplitude of the sampled electrical signal based on the initial noise ratio parameter, to obtain the first noise amount.

In some embodiments of this application, the processing module is further configured to: obtain a tolerable-noise amount $\sigma_G$ of the sampled electrical signal at a preset sampling point; determine maximum noise $\sigma_{max}$ corresponding to the electrical signal at the maximum level in the following manner: $\sigma_{max} = M \sigma_G$, where M represents the initial noise ratio parameter; determine the minimum noise amount corresponding to the electrical signal at the minimum level is $\sigma_G$; perform quantization between the maximum level and the minimum level to obtain N level values, where the N level values are all between the maximum level and the minimum level, and N is a positive integer; calculate N noise amounts respectively corresponding to the N level values according to a preset interpolation algorithm; determine that the level amplitude of the sampled electrical signal is a first level value in the N level values; and obtain a first noise amount corresponding to the first level value based on a correspondence between the N level values and the N noise amounts.

In some embodiments of this application, the processing module is further configured to: obtain a correspondence between a level amplitude and a noise amount based on the preset initial noise ratio parameter, the maximum noise amount, and the minimum noise amount, where the correspondence between a level amplitude and a noise amount includes a noise amount corresponding to each level amplitude that is greater than the minimum level and less than the maximum level; and search the correspondence between a level amplitude and a noise amount by using the level amplitude of the sampled electrical signal, to obtain the first noise amount.

In some embodiments of this application, the processing module is further configured to: after performing waveform sampling on the optical signal to obtain the sampled electrical signal, perform time-domain equalization processing on the sampled electrical signal by using an equalizer, to obtain an equalized electrical signal.

In some embodiments of this application, the processing module is further configured to: obtain an equalization parameter corresponding to the equalizer, where the equalization parameter includes a tap length of the equalizer and a tap coefficient of the equalizer; and obtain a first noise amount corresponding to the equalized electrical signal based on the level amplitude of the sampled electrical signal, the equalization parameter, and the initial noise ratio parameter.

In some embodiments of this application, the processing module is further configured to: obtain a correspondence between level amplitudes and noise amounts at consecutive sampling points based on the level amplitude of the sampled electrical signal, the equalization parameter, and the initial noise ratio parameter; determine a third noise amount corresponding to the electrical signal at the maximum level and a fourth noise amount corresponding to the electrical signal at the minimum level based on the correspondence between level amplitudes and noise amounts at consecutive sampling points; modify the initial noise ratio parameter based on the third noise amount and the fourth noise amount, to obtain a modified noise ratio parameter; obtain a noise enhancement factor based on the equalization parameter, where the noise enhancement factor is used to represent a noise enhancement degree of the equalizer; and obtain the first noise amount corresponding to the equalized electrical signal based on the level amplitude of the sampled electrical signal, the modified noise ratio parameter, the noise enhancement factor, and an average optical power, where the average optical power is an average value of optical powers of the sampled electrical signal at different level amplitudes.

In some embodiments of this application, the processing module is further configured to calculate the first noise amount $\sigma_{DUT\_estimated}$ corresponding to the equalized electrical signal in the following manner:

$$\frac{1}{2}\left(\frac{\int f_u(y) \cdot Q\left(\frac{y - P_{th}}{M(y) \cdot C_{eq}\sigma_{DUT\_estimated}}\right)dy}{\int f_u(y)dy}\right) + \frac{1}{2}\left(\frac{\int f_l(y) \cdot Q\left(\frac{P_{th} - y}{M(y) \cdot C_{eq}\sigma_{DUT\_estimated}}\right)dy}{\int f_l(y)dy}\right) = BER_{target}$$

where y represents a signal power collected at a sampling point at which the sampled electrical signal is located, $P_{th}$ represents the average optical power, $f_u(y)$ is amplitude distribution at a sampling point at which an optical power is greater than $P_{th}$, $f_l(y)$ is amplitude distribution at a sampling point at which an optical power is less than $P_{th}$, $M(y)$ represents the modified noise ratio parameter, $C_{eq}$ is the noise enhancement factor, $BER_{target}$ is a bit error rate threshold, and Q represents a tail function with standard normal distribution.

In some embodiments of this application, the processing module is further configured to: determine P consecutive sampling points corresponding to P taps in the equalizer, where a value of P is a positive integer; and calculate, in the following manner, a noise amount $noise_{eq}(n)$ that is at an $n^{th}$ sampling point and that exists after equalization:

$$noise_{eq}(n) = \sqrt{\sum_{\substack{m=-\frac{P-1}{2}}}^{\frac{P-1}{2}} |noise(n-m) \cdot h_{eq}(m)|^2 + \sum_{\substack{m=-\frac{L-1}{2} \\ m \notin [-\frac{P-1}{2}, \frac{P-1}{2}]}}^{\frac{L-1}{2}} |\sigma_{average} \cdot h_{eq}(m)|^2}$$

where L represents the tap length of the equalizer, $h_{eq}$ represents the tap coefficient of the equalizer, $noise(n-m)$ represents a noise amount that is at an $(n-m)^{th}$ sampling point and that exists before time-domain equalization processing is performed, and $\sigma_{average}$ is an average noise amount at different level amplitudes; and the processing module is further configured to: quantize the level amplitude of the sampled electrical signal to obtain W levels, where W is a positive integer; and obtain the correspondence between level amplitudes and noise amounts at consecutive sampling points based on the calculation manner of $noise_{eq}(n)$, where the correspondence between level amplitudes and noise amounts at consecutive sampling points includes WP noise amounts corresponding to level amplitudes at the P consecutive sampling points.

In this solution, to evaluate an impact of a receiver on noise distribution, the correspondence between level amplitudes and noise amounts at consecutive sampling points may be obtained based on the equalization parameter. For example, the correspondence between level amplitudes and noise amounts at consecutive sampling points may be a look-up table related to a level amplitude and noise existing after equalization, and different noise amounts are assigned to sampled electrical signals at different level amplitudes based on the look-up table. It is assumed that only noise corresponding to P consecutive intermediate sampling points of the equalizer is considered. In an actual application scenario, only a look-up table related to a level amplitude and a noise amount needs to be established. The level amplitude is quantized to obtain W levels, a look-up table whose depth is P is established, the table includes a total of WP search items, and the WP search items include WP noise amounts corresponding to the level amplitudes at the P consecutive sampling points.

In some embodiments of this application, the processing module is further configured to calculate the second noise amount $\sigma_{ideal_{estimated}}$ corresponding to the ideal electrical signal in the following manner:

$$\frac{1}{2}Q\left(\frac{y-P_{th}}{M \cdot \sigma_{ideal\_estimated}}\right) + \frac{1}{2}Q\left(\frac{P_{th}-y}{\sigma_{ideal\_estimated}}\right) = BER_{target}$$

where y represents a signal power collected at a sampling point at which the ideal electrical signal is located, $P_{th}$ represents an average optical power, the average optical power is an average value of optical powers of the ideal electrical signal at different level amplitudes, M represents the initial noise ratio parameter, $BER_{target}$ is a bit error rate threshold, and Q represents a tail function with standard normal distribution.

In this solution, the average optical power corresponding to the ideal electrical signal further needs to be determined, and the average optical power is an average value of optical powers of the ideal electrical signal at different level amplitudes. For example, in subsequent embodiments, $P_{th}$ or $P_{ave}$ represents the average optical power. Based on the obtained initial noise ratio parameter and the level amplitude of the ideal electrical signal, the second noise amount $\sigma_{ideal_{estimated}}$ corresponding to the ideal electrical signal may be obtained, and the second noise amount $\sigma_{ideal_{estimated}}$ may be used for a subsequent consistency test on the transmitter.

In some embodiments of this application, the processing module is further configured to calculate a transmitter and dispersion eye closure penalty by using the first noise amount and the second noise amount.

In some embodiments of this application, the processing module is further configured to calculate the transmitter and dispersion eye closure penalty $TDEC_{calculated}$ in the following manner:

$$TDEC_{calculated} = \frac{\sigma_{DUT}}{\sigma_{ideal}}$$

where $\sigma_{DUT}$ represents the first noise amount, and $\sigma_{ideal}$ represents the second noise amount.

In some embodiments of this application, the processing module is further configured to: when the bit error rate threshold is used, obtain noise amounts respectively corresponding to the sampled electrical signal and the ideal electrical signal; obtain a modification relationship between a transmitter and dispersion eye closure penalty and a noise amount based on the noise amounts that respectively correspond to the sampled electrical signal and the ideal electrical signal and that are obtained when the bit error rate threshold is used; and modify the calculated transmitter and dispersion eye closure penalty $TDEC_{calculated}$ in the following manner:

$$TDEC_{actual} = TDEC_{calculated} f(TDEC_{actual}, TDEC_{calculated})$$

where $TDEC_{actual}$ represents a modified transmitter and dispersion eye closure penalty, and $f(TDEC_{actual}, TDEC_{calculated})$ represents the modification relationship between a transmitter and dispersion eye closure penalty and a noise amount.

In the second aspect of this application, the modules included in the apparatus for obtaining a transmitter test parameter may further perform the steps described in the first aspect and the possible implementations thereof. For details, refer to the descriptions of the first aspect and the possible implementations thereof.

According to a third aspect, an embodiment of this application provides a computer-readable storage medium. The computer-readable storage medium stores instructions.

When the instructions are run on a computer, the computer is enabled to perform the method according to the first aspect.

According to a fourth aspect, an embodiment of this application provides a computer program product including instructions. When the computer program product runs on a computer, the computer is enabled to perform the method according to the first aspect.

According to a fifth aspect, an embodiment of this application provides a receiver, where the receiver may include an entity such as a terminal device or a chip, the receiver includes a processor and a memory, the memory is configured to store instructions, and the processor is configured to execute the instructions in the memory, so that the receiver performs the method described in the first aspect.

According to a sixth aspect, this application provides a chip system. The chip system includes a processor, configured to support an apparatus for obtaining a transmitter test parameter in implementing functions in the foregoing aspects, for example, sending or processing data and/or information in the foregoing methods. In a possible design, the chip system further includes a memory. The memory is configured to store program instructions and data that are necessary for the apparatus for obtaining a transmitter test parameter. The chip system may include a chip, or include a chip and other discrete devices.

DESCRIPTION OF EMBODIMENTS

Embodiments of this application provide a method and an apparatus for obtaining a transmitter test parameter, and a storage medium, to obtain a noise amount corresponding to a level amplitude of a sampled electrical signal, without limiting a type of a receiver that performs a consistency test on a transmitter by using a transmitter test parameter.

The following describes the embodiments of this application with reference to the accompanying drawings.

In the specification, claims, and accompanying drawings of this application, the terms such as "first" and "second" are intended to distinguish between similar objects but do not necessarily indicate a specific order or sequence. It should be understood that the terms used in such away are interchangeable in proper circumstances. This is merely a distinguishing manner that is used when objects having a same attribute are described in the embodiments of this application. In addition, the terms "include", "have", and any other variants thereof are intended to cover the non-exclusive inclusion, so that a process, method, system, product, or device that includes a series of units is not necessarily limited to those units, but may include other units not expressly listed or inherent to such a process, method, system, product, or device.

Figure 1:
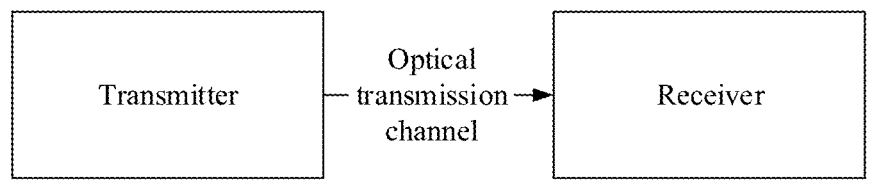
FIG. 1 is a schematic diagram of composition of a system for performing a consistency test on a transmitter according to an embodiment of this application.

The technical solutions in the embodiments of this application may be applied to a system for performing a consistency test on a transmitter. FIG. 1 is a schematic diagram of composition of a system for performing a consistency test on a transmitter according to an embodiment of this application. The system for performing a consistency test on a transmitter may include a transmitter and a receiver, and an optical transmission channel may be configured between the transmitter and the receiver, for example, the optical transmission channel includes an optical fiber. The transmitter may send an optical signal to the receiver, and the receiver may receive the optical signal, and complete a consistency test on the transmitter by using the optical signal.

In this embodiment of this application, when the receiver performs a consistency test on the transmitter, a transmitter test parameter needs to be obtained. For example, the receiver may include an apparatus for obtaining a transmitter test parameter, that is, the apparatus for obtaining a transmitter test parameter is a component of the receiver. The apparatus for obtaining a transmitter test parameter may perform the method for obtaining a transmitter test parameter in the embodiments of this application. Alternatively, the apparatus for obtaining a transmitter test parameter is a device independent of the receiver. The apparatus for obtaining a transmitter test parameter performs the subsequent method for obtaining a transmitter test parameter. The receiver may obtain the transmitter test parameter from the apparatus for obtaining a transmitter test parameter, and then the receiver may perform a consistency test on the transmitter. An example in which the receiver performs the method for obtaining a transmitter test parameter is used for description in subsequent embodiments.

In this embodiment of this application, there are a plurality of methods in which the receiver performs a consistency test on the transmitter. For example, the methods may include a transmitter and dispersion eye closure penalty (TDEC) and a transmitter and dispersion eye closure penalty quaternary (TDECQ). No limitation is imposed. In this embodiment of this application, the receiver may perform a consistency test on the transmitter by using another solution. This is not limited herein.

Figure 2:
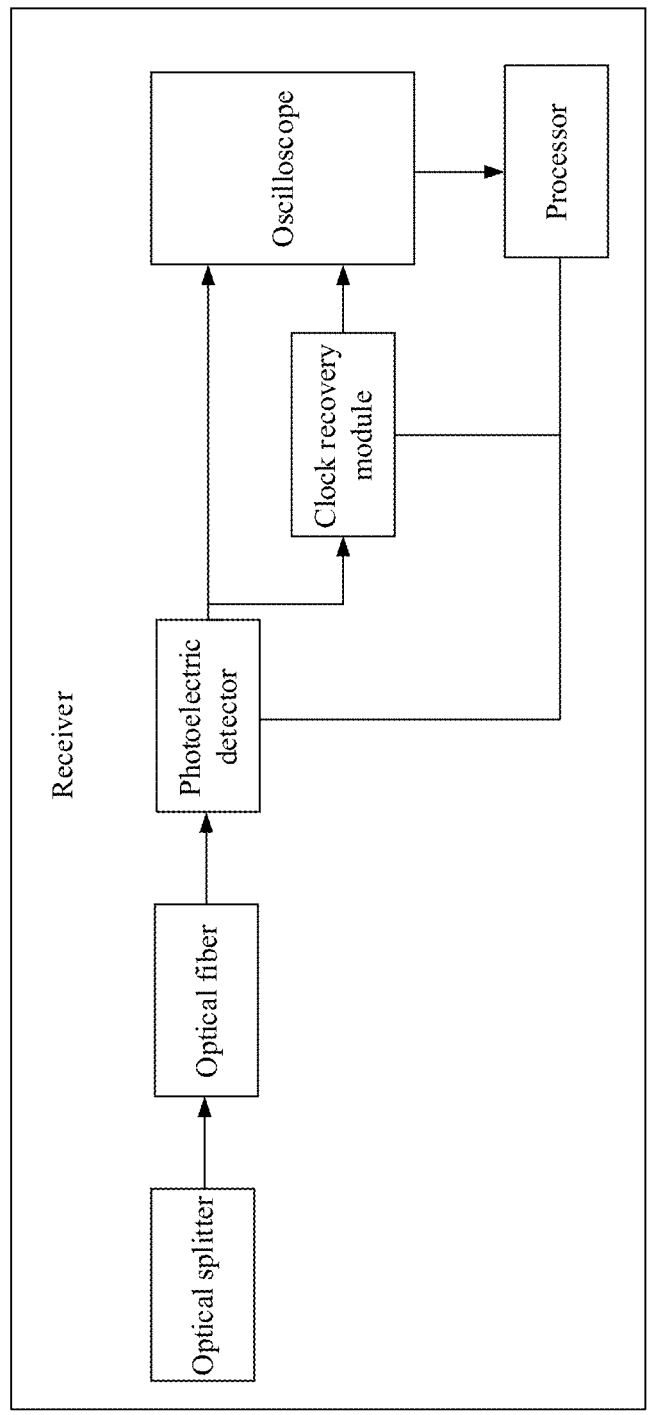
FIG. 2 is a schematic diagram of composition of a receiver according to an embodiment of this application.

In some embodiments of this application, FIG. 2 is a schematic diagram of composition of a receiver according to an embodiment of this application. The receiver may include an optical splitter, an optical fiber, a photoelectric detector, a clock recovery module, an oscilloscope, and a processor. First, the optical splitter splits, through the optical transmission channel, the optical signal sent by the transmitter. Next, the optical splitter transmits the optical signal to the photoelectric detector by using the optical fiber. The photoelectric detector converts the optical signal into an electrical signal. Then, the clock recovery module performs clock recovery on the electrical signal, and then transmits the electrical signal to the oscilloscope. The oscilloscope collects a complete sampled electrical signal in a pattern triggered manner or by directly using the oscilloscope in real time. Finally, the processor obtains a noise amount corresponding to the sampled electrical signal, and the processor performs a consistency test on the transmitter. For details, refer to detailed descriptions of the method for obtaining a transmitter test parameter that is performed by the processor in subsequent embodiments.

Figure 3:
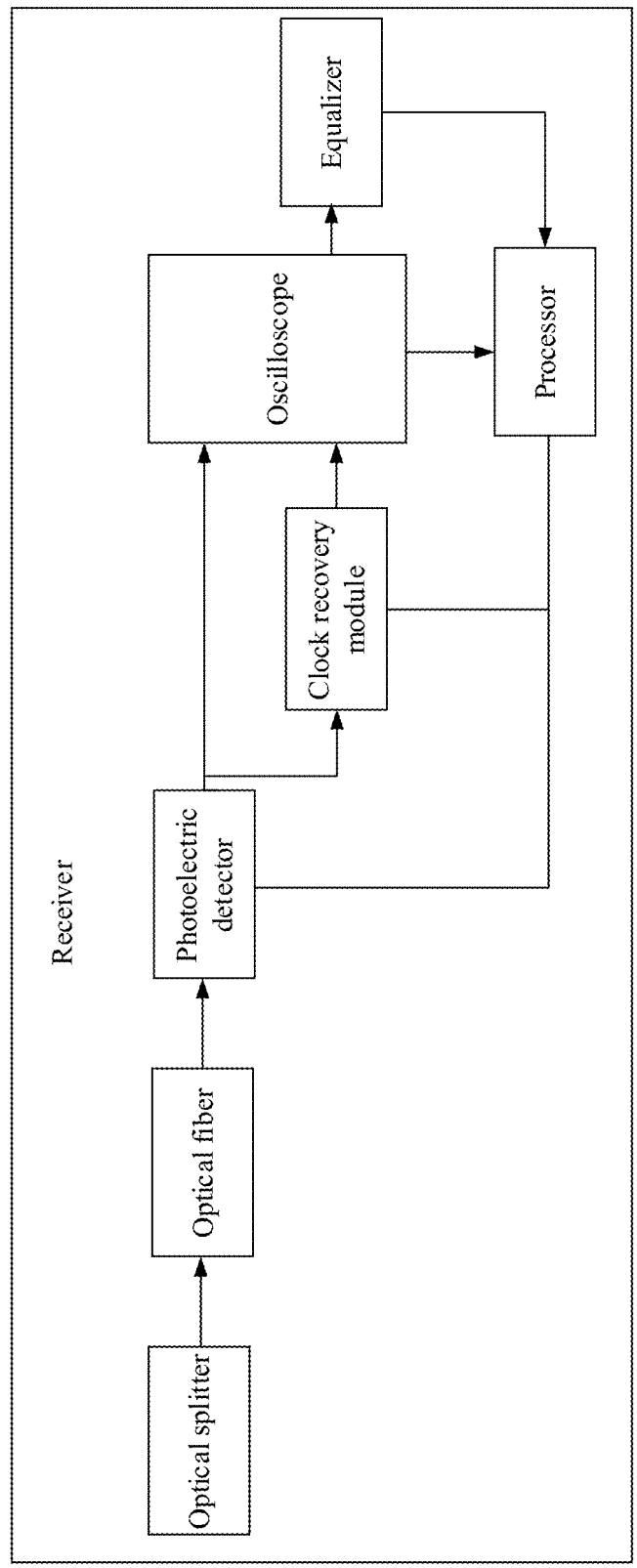
FIG. 3 is a schematic diagram of composition of another receiver according to an embodiment of this application.

In some other embodiments of this application, FIG. 3 is a schematic diagram of composition of another receiver according to an embodiment of this application. In addition to an optical splitter, an optical fiber, a photoelectric detector, a clock recovery module, an oscilloscope, and a processor, the receiver may further include an equalizer. The equalizer is configured to perform time-domain equalization processing on a sampled electrical signal to obtain an equalized electrical signal. Finally, the processor obtains a noise amount corresponding to the equalized electrical signal, and the processor performs a consistency test on a transmitter. For details, refer to detailed descriptions of the method for obtaining a transmitter test parameter that is performed by the processor in subsequent embodiments.

Figure 4:
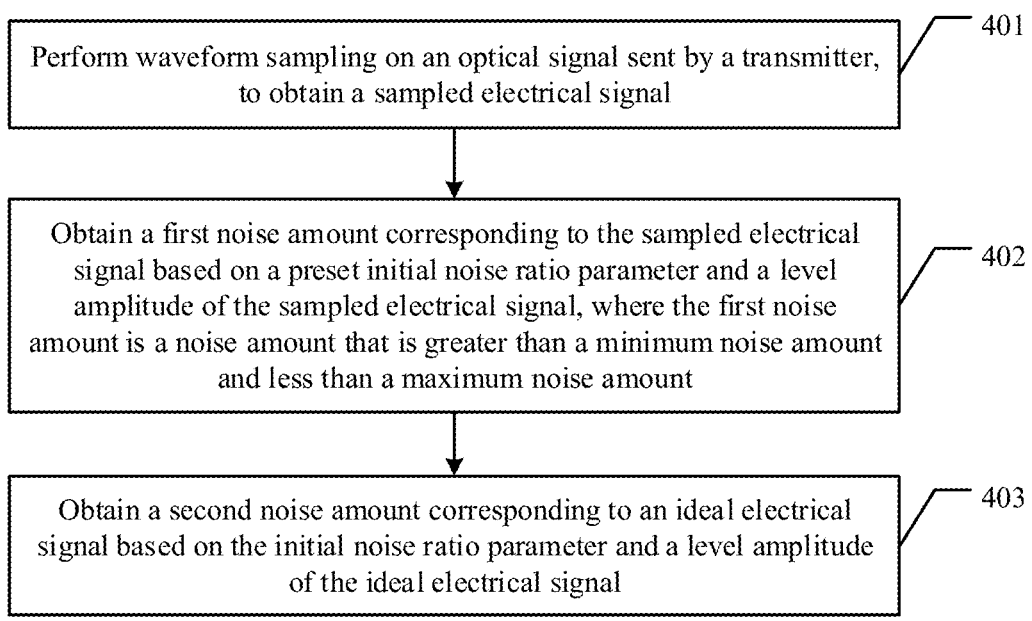
FIG. 4 is a schematic block flowchart of a method for obtaining a transmitter test parameter according to an embodiment of this application.

Based on the foregoing receiver, a method for obtaining a transmitter test parameter in an embodiment of this application is described below. The method for obtaining a transmitter test parameter may be performed by an apparatus for obtaining a transmitter test parameter. For example, the apparatus for obtaining a transmitter test parameter may be a component of the receiver. An example in which the receiver performs the method for obtaining a transmitter test parameter is used for description in subsequent embodiments. As shown in FIG. 4, the method for obtaining a transmitter test parameter provided in this embodiment of this application includes the following steps:

401. Perform waveform sampling on an optical signal sent by a transmitter, to obtain a sampled electrical signal.

The receiver may receive the optical signal from the transmitter, and the optical signal carries data that is sent by the transmitter to the receiver.

In some embodiments of this application, if the method for obtaining a transmitter test parameter is performed by the apparatus for obtaining a transmitter test parameter, the apparatus for obtaining a transmitter test parameter may obtain, by using the receiver, the optical signal sent by the transmitter.

In this embodiment of this application, it may be learned from FIG. 2 and FIG. 3 that the receiver may perform waveform sampling by using the optical splitter, the photoelectric detector, and the oscilloscope, to convert the optical signal into an electrical signal, and sample the electrical signal to obtain a sampled electrical signal. The sampled electrical signal has a level amplitude. The level amplitude of the sampled electrical signal obtained through sampling is not limited. In this embodiment of this application, the level amplitude of the sampled electrical signal is a basis for determined a noise amount for the sampled electrical signal. Different noise amounts may be determined for different levels amplitudes of the sampled electrical signal, so that actual optical power attenuation of different optical signals transmitted by the transmitter can be simulated, to reflect actual performance of the transmitter. For details, refer to detailed descriptions of noise amount determining in the subsequent step 402.

402. Obtain a first noise amount corresponding to the sampled electrical signal based on a preset initial noise ratio parameter and a level amplitude of the sampled electrical signal, where the level amplitude of the sampled electrical signal is greater than a minimum level and less than a maximum level, the initial noise ratio parameter is a ratio of a maximum noise amount to a minimum noise amount, the maximum noise amount is a noise amount corresponding to an electrical signal at the maximum level, the minimum noise amount is a noise amount corresponding to an electrical signal at the minimum level, and the first noise amount is a noise amount that is greater than the minimum noise amount and less than the maximum noise amount.

In this embodiment of this application, after the sampled electrical signal is obtained, the level amplitude of the sampled electrical signal may be determined, and the preset initial noise ratio parameter may be further obtained. The initial noise ratio parameter is the ratio of the maximum noise amount to the minimum noise amount. The maximum noise amount is a noise amount corresponding to the electrical signal at the maximum level, for example, the maximum level may be 1. The minimum noise amount is a noise amount corresponding to the electrical signal at the minimum level, for example, the minimum level may be 0. The maximum noise amount and the minimum noise amount may be determined based on an electric signal at a predetermined maximum level and an electric signal at a predetermined minimum level. After the maximum noise amount and the minimum noise amount are determined, the preset initial noise ratio parameter may be determined.

In this embodiment of this application, the initial noise ratio parameter may be used to calculate the first noise amount corresponding to the sampled electrical signal. The first noise amount is specifically a noise amount corresponding to a sampled electrical signal obtained by the apparatus for obtaining a transmitter test parameter. In this embodiment of this application, the first noise amount corresponding to the sampled electrical signal is a noise amount that is greater than the minimum noise amount and less than the maximum noise amount. For example, the first noise amount may be a noise amount in a first interval, a maximum value of the first interval is the maximum noise amount, and a minimum value of the first interval is the minimum noise amount. A specific value of the first noise amount is not limited, provided that the first noise amount is between the maximum noise amount and the minimum noise amount. The first noise amount corresponding to the sampled electrical signal depends on the level amplitude of the sampled electrical signal and the initial noise ratio parameter. In this embodiment of this application, the receiver may determine different noise amounts for different level amplitudes of the sampled electrical signal. This is substantially different from a current solution in which a same noise amount is determined for all sampled electrical signals. Therefore, in this embodiment of this application, when the receiver performs a consistency test on the transmitter by using a noise amount corresponding to the sampled electrical signal, actual optical power attenuation of different optical signals transmitted by the transmitter can be simulated, to reflect actual performance of the transmitter. In addition, in this embodiment of this application, noise amounts corresponding to sampled electrical signals at different level amplitudes are different, that is, a noise amount corresponding to the level amplitude of the sampled electrical signal may be obtained. Therefore, this solution is applicable to different types of receivers. A type of a receiver that performs a consistency test on a transmitter by using a transmitter test parameter is not limited in this embodiment of this application. For example, this embodiment of this application is applicable to a PIN receiver, and is also applicable to an APD receiver.

In this embodiment of this application, there are a plurality of specific manners of obtaining the first noise amount corresponding to the sampled electrical signal. For example, a preset calculation method may be used to use the initial noise ratio parameter and the level amplitude of the sampled electrical signal as an input condition. A specific value of the first noise amount may be obtained by using the calculation method, provided that the calculated first noise amount is between the maximum noise amount and the minimum noise amount.

In some embodiments of this application, step 402 of obtaining a first noise amount corresponding to the sampled electrical signal based on a preset initial noise ratio parameter and a level amplitude of the sampled electrical signal includes:

obtaining a correspondence between a level amplitude and a noise amount based on the preset initial noise ratio parameter, the maximum noise amount, and the minimum noise amount, where the correspondence between a level amplitude and a noise amount includes a noise amount corresponding to each level amplitude that is greater than the minimum level and less than the maximum level; and searching the correspondence between a level amplitude and a noise amount by using the level amplitude of the sampled electrical signal, to obtain the first noise amount.

In this embodiment of this application, the correspondence between a level amplitude and a noise amount may be pre-established based on the initial noise ratio parameter, the maximum noise amount, and the minimum noise amount. For example, the correspondence between a level amplitude and a noise amount includes the maximum noise amount corresponding to the electrical signal at the maximum level and the minimum noise amount corresponding to the electrical signal at the minimum level. The correspondence between a level amplitude and a noise amount further includes a noise amount corresponding to an electrical signal at a level between the maximum level and the minimum level. In other words, the correspondence may include noise amounts respectively corresponding to all level amplitudes. For example, the correspondence may be a table or a set. For example, the table includes different noise amounts respectively corresponding to all level amplitudes. After the level amplitude of the sampled electrical signal is obtained, the noise amount corresponding to the level amplitude of the sampled electrical signal may be determined by searching the correspondence. In this case, the noise amount obtained by searching the correspondence is the first noise amount corresponding to the sampled electrical signal.

In some embodiments of this application, different noise amounts may be determined for different level amplitudes of the sampled electrical signal. For example, when the sampled electrical signal is the electrical signal at the maximum level, it is determined that the first noise amount is the maximum noise amount. For another example, when the sampled electrical signal is the electrical signal at the minimum level, it is determined that the first noise amount is the minimum noise amount. In addition, in some embodiments of this application, step 402 of obtaining a first noise amount corresponding to the sampled electrical signal based on a preset initial noise ratio parameter and a level amplitude of the sampled electrical signal includes:

4021. Determine that the level amplitude of the sampled electrical signal is between the maximum level and the minimum level.

4022. Use the maximum noise amount and the minimum noise amount as an interpolation condition, and perform interpolation calculation on the level amplitude of the sampled electrical signal based on the initial noise ratio parameter, to obtain the first noise amount.

After the level amplitude of the sampled electrical signal is obtained, it is determined whether the level amplitude of the sampled electrical signal is between the maximum level and the minimum level. For example, if the maximum level is 1 and the minimum level is 0, the level amplitude of the sampled electrical signal may be 0.8, 0.9, 0.6, or the like. The maximum noise amount and the minimum noise amount are used as the interpolation condition, that is, the maximum noise amount and the minimum noise amount are used as two endpoint values of an interpolation algorithm, and interpolation calculation is performed on the level amplitude of the sampled electrical signal based on the initial noise ratio parameter, to obtain the first noise amount. A larger level amplitude of the sampled electrical signal indicates a larger first noise amount corresponding to the sampled electrical signal. A smaller level amplitude of the sampled electrical signal indicates a smaller first noise amount corresponding to the sampled electrical signal.

In some embodiments of this application, the interpolation algorithm is an algorithm used to calculate a result by using an interpolation function when the maximum noise amount and the minimum noise amount are known. A plurality of interpolation algorithms may be used in this embodiment of this application. For example, the interpolation algorithm may be linear interpolation, nearest-neighbor interpolation, or bilinear interpolation. This is not limited herein.

Further, in some embodiments of this application, step 4022 of using the maximum noise amount and the minimum noise amount as an interpolation condition, and performing interpolation calculation on the level amplitude of the sampled electrical signal based on the initial noise ratio parameter, to obtain the first noise amount includes:

A1. Obtain a tolerable-noise amount $\sigma_G$ of the sampled electrical signal at a preset sampling point.

A2. Determine maximum noise $\sigma_{max}$ corresponding to the electrical signal at the maximum level in the following manner:

$\sigma_{max} = M\sigma_G$, where M represents the initial noise ratio parameter.

A3. Determine the minimum noise amount corresponding to the electrical signal at the minimum level is $\sigma_G$.

A4. Perform quantization between the maximum level and the minimum level to obtain N level values, where the N level values are all between the maximum level and the minimum level, and N is a positive integer.

A5. Calculate N noise amounts respectively corresponding to the N level values according to a preset interpolation algorithm.

A6. Determine that the level amplitude of the sampled electrical signal is a first level value in the N level values.

A7. Obtain a first noise amount corresponding to the first level value based on a correspondence between the N level values and the N noise amounts.

The preset sampling point of the sampled electrical signal is first determined. For example, in a TDEC scenario, determined sampling points may be a sampling point at a 0.4 unit interval (UI) location and a sampling point at a 0.6 UI location. The tolerable-noise amount $\sigma_G$ of the sampled electrical signal at the preset sampling point is obtained. For example, the noise amount corresponding to the sampled electrical signal is obtained by using a Gaussian noise model, to obtain maximum tolerable-noise amounts $\sigma_R$ and $\sigma_L$ at the sampling points at the left and right locations (the 0.4 UI location and the 0.6 UI location). In this case, the tolerable-noise amount $\sigma_G$ of the sampled electrical signal at the preset sampling point is the tolerable-noise amount $\sigma_L$ or $\sigma_R$ at the sampling point at the left location (0.4 UI) or the right location (0.6 UI). After $\sigma_G$ is obtained, the maximum noise $\sigma_{max}$ corresponding to the electrical signal at the maximum level may be determined: $\sigma_{max}=M\sigma_G$, where M represents the initial noise ratio parameter. It is determined that the minimum noise amount corresponding to the electrical signal at the minimum level is $\sigma_G$.

Level amplitude quantization is performed based on the maximum level and the minimum level, to obtain the N level values through quantization between the maximum level and the minimum level. In this case, the N level values are all between the maximum level and the minimum level, and N is a positive integer. Next, the N noise amounts respectively corresponding to the N level values are calculated according to the preset interpolation algorithm, that is, one noise amount is calculated according to the interpolation algorithm for each of the N level values obtained through quantization. In this case, the N noise amounts may be calculated for the N level values. For example, the correspondence between a level amplitude and a noise amount may include the N noise amounts respectively corresponding to the N level values. If it is determined that the level amplitude of the sampled electrical signal is the first level value in the N level values, the first level value is a level value in the N level values. Finally, the first noise amount corresponding to the first level value is obtained based on the correspondence between the N level values and the N noise amounts. In this embodiment of this application, it is determined that the level amplitude of the sampled electrical signal is the first level value in the N level values, and the correspondence between the N level values and the N noise amounts is searched by using the first level value, to determine the first noise amount corresponding to the sampled electrical signal. In this embodiment of this application, different noise amounts may be determined for different level amplitudes of the sampled electrical signal. This embodiment of this application provides a solution for obtaining fine noise amounts corresponding to different level amplitudes of the sampled electrical signal. Therefore, in this embodiment of this application, actual optical power attenuation of different optical signals transmitted by the transmitter may be simulated, to reflect actual performance of the transmitter. In this embodiment of this application, noise amounts corresponding to sampled electrical signals at different level amplitudes are different, that is, the noise amount corresponding to the level amplitude of the sampled electrical signal may be obtained. Therefore, this solution is applicable to different types of receivers. A type of a receiver that performs a consistency test on a transmitter by using a transmitter test parameter is not limited in this embodiment of this application.

Figure 5:
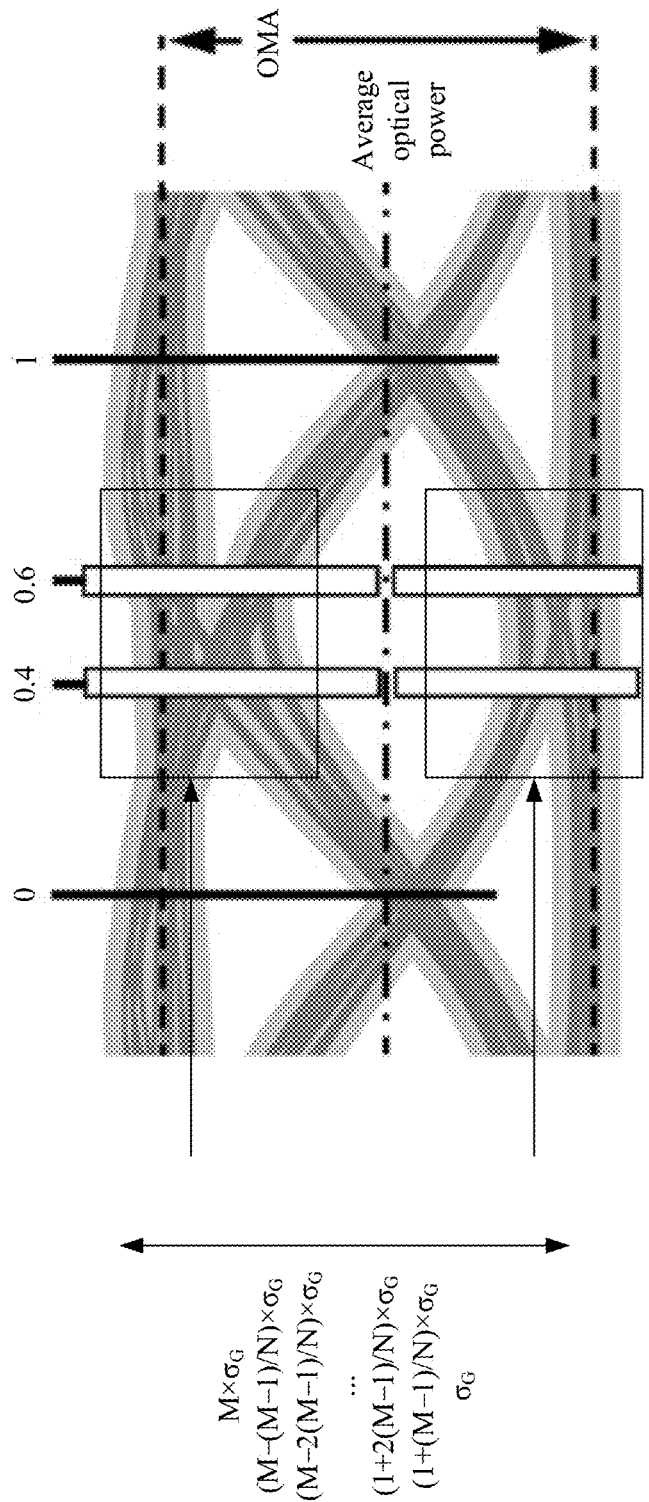
FIG. 5 is a schematic diagram of an eye diagram of a sampled electrical signal according to an embodiment of this application.

For example, FIG. 5 is a schematic diagram of an eye diagram of a sampled electrical signal according to an embodiment of this application. An example in which the receiver is an APD receiver is used. When receiving an optical signal sent by the transmitter, the APD receiver may sample the optical signal to obtain a sampled electrical signal. The APD receiver may obtain an initial noise ratio parameter M, and then obtain a first noise amount corresponding to the sampled electrical signal. For example, a level amplitude of the sampled electrical signal may be a level 1 or a level 0. It is determined that noise corresponding to a sampling point at which a level is higher than a determining threshold is $M\sigma_G$, and noise corresponding to a sampling point at which a level is lower than the determining threshold is $\sigma_G$. However, due to factors such as limited bandwidth and non-linearity, the eye diagram has more than two levels, and further includes various cross levels, that is, the level amplitude of the sampled electrical signal is between a maximum level and a minimum level, for example, a level at a sampling point is not limited to 0 and 1, and may be a cross level such as 0.9 or 0.8.

In this embodiment of this application, a more precise noise amount corresponding to the level amplitude of the sampled electrical signal may be obtained. For example, the N noise amounts obtained according to a linear interpolation algorithm are respectively $(M-(M-1)/N)\times\sigma_G$, $(M-2(M-1)/N)\times\sigma_G$, ..., $(1+2(M-1)/N)\times\sigma_G$, and $(1+(M-1)/N)\times\sigma_G$. When the level at the sampling point is 1 and 0, the corresponding noise amounts are $M\sigma_G$ and $\sigma_G$. For a sampling point corresponding to an intermediate level such as 0.9 or 0.8, a noise amount is obtained according to the interpolation algorithm. FIG. 5 shows a result of linear interpolation. For example, when the level amplitude of the sampled electrical signal is 0.5, a noise amount determined for the sampled electrical signal is $(M+1)\sigma_G/2$.

In some embodiments of this application, based on the composition of the receiver shown in FIG. 3, after the receiver performs waveform sampling on the electrical signal by using the oscilloscope, to obtain the sampled electrical signal, the method provided in this embodiment of this application further includes the following step:

B1. Perform time-domain equalization processing on the sampled electrical signal by using an equalizer, to obtain an equalized electrical signal.

The receiver may further include an equalizer. In this case, the sampled electrical signal is further input to the equalizer. Because the equalizer performs time-domain equalization processing on the sampled electrical signal, the equalized electrical signal is obtained. Due to a time-domain convolution function of the equalizer, noise corresponding to different level amplitudes is averaged. Therefore, the first noise amount needs to be determined again for the equalized electrical signal.

In some embodiments of this application, in an implementation scenario in which step B1 is performed, step 402 of obtaining a first noise amount corresponding to the sampled electrical signal based on a preset initial noise ratio parameter and a level amplitude of the sampled electrical signal includes:

C1. Obtain an equalization parameter corresponding to the equalizer, where the equalization parameter includes a tap length of the equalizer and a tap coefficient of the equalizer.

C2. Obtain a first noise amount corresponding to the equalized electrical signal based on the level amplitude of the sampled electrical signal, the equalization parameter, and the initial noise ratio parameter.

The receiver may further include an equalizer. In this case, the sampled electrical signal is further input to the equalizer. Because the equalizer performs time-domain equalization processing on the sampled electrical signal, the equalized electrical signal is obtained, and the equalization parameter corresponding to the equalizer is obtained. Specifically, the obtained equalization parameter may include the tap length of the equalizer and the tap coefficient of the equalizer. The tap length may be represented by L, and the tap coefficient depends on a parameter of the equalizer.

In this embodiment of this application, after the sampled electrical signal is further processed by the equalizer, the equalized electrical signal is output. Due to the time-domain convolution function of the equalizer, noise corresponding to the maximum level and the minimum level is averaged, and a ratio of the maximum noise amount to the minimum noise amount is less than the foregoing initial noise ratio parameter M. Therefore, after the sampled electrical signal is processed by the equalizer, the first noise amount needs to be obtained again for the equalized electrical signal based on the level amplitude of the sampled electrical signal, the equalization parameter, and the initial noise ratio parameter. The equalization parameter of the equalizer affects the first noise amount corresponding to the equalized electrical signal. Therefore, the first noise amount corresponding to the equalized electrical signal may be obtained, so that optical power attenuation of a signal due to noise when an equalizer is used in the receiver can be simulated, to reflect actual performance of the transmitter.

In some embodiments of this application, step C2 of obtaining a first noise amount corresponding to the equalized electrical signal based on the level amplitude of the sampled electrical signal, the equalization parameter, and the initial noise ratio parameter may specifically include the following steps:

C21. Obtain a correspondence between level amplitudes and noise amounts at consecutive sampling points based on the level amplitude of the sampled electrical signal, the equalization parameter, and the initial noise ratio parameter.

C22. Determine a third noise amount corresponding to the electrical signal at the maximum level and a fourth noise amount corresponding to the electrical signal at the minimum level based on the correspondence between level amplitudes and noise amounts at consecutive sampling points.

C23. Modify the initial noise ratio parameter based on the third noise amount and the fourth noise amount, to obtain a modified noise ratio parameter.

C24. Obtain a noise enhancement factor based on the equalization parameter, where the noise enhancement factor is used to represent a noise enhancement degree of the equalizer.

C25. Obtain the first noise amount corresponding to the equalized electrical signal based on the level amplitude of the sampled electrical signal, the modified noise ratio parameter, the noise enhancement factor, and an average optical power, where the average optical power is an average value of optical powers of the sampled electrical signal at different level amplitudes.

Specifically, in step C21, the correspondence between level amplitudes and noise amounts at consecutive sampling points is first obtained based on the level amplitude of the sampled electrical signal, the equalization parameter, and the initial noise ratio parameter. The correspondence between level amplitudes and noise amounts at consecutive sampling points is a correspondence between level amplitudes at a plurality of consecutive sampling points and values of noise amounts. For example, the correspondence may be a table or a set. For example, the correspondence may include noise amounts corresponding to level amplitudes at P consecutive sampling points. After the level amplitude of the sampled electrical signal is obtained, different noise amounts corresponding to level amplitudes at different consecutive sampling point may be determined by searching the correspondence. The correspondence between level amplitudes and noise amounts at consecutive sampling points may include different noise amounts corresponding to different level amplitudes at P consecutive sampling points.

Further, step C21 of obtaining a correspondence between level amplitudes and noise amounts at consecutive sampling points based on the equalization parameter includes:

C211. Determine P consecutive sampling points corresponding to P taps in the equalizer, where a value of P is a positive integer.

C212. Calculate, in the following manner, a noise amount $noise_{eq}(n)$ that is at an $n^{th}$ sampling point and that exists after equalization:

$$noise_{eq}(n) = \sqrt{\sum_{\substack{m=-\frac{P-1}{2} \\ }}^{\frac{P-1}{2}} |noise(n-m) \cdot h_{eq}(m)|^2 + \sum_{\substack{m=-\frac{L-1}{2} \\ m \notin [-\frac{P-1}{2}, \frac{P-1}{2}]}}^{\frac{L-1}{2}} |\sigma_{average} \cdot h_{eq}(m)|^2}$$

where L represents the tap length of the equalizer, $h_{eq}$ represents the tap coefficient of the equalizer, $noise(n-m)$ represents a noise amount that is at an $(n-m)^{th}$ sampling point and that exists before time-domain equalization processing is performed, and $\sigma_{average}$ is an average noise amount at different level amplitudes.

C213. Quantize the level amplitude of the sampled electrical signal to obtain W levels, where W is a positive integer.

C214. Obtain the correspondence between level amplitudes and noise amounts at consecutive sampling points based on the calculation manner of $noise_{eq}(n)$, where the correspondence between level amplitudes and noise amounts at consecutive sampling points includes WP noise amounts corresponding to level amplitudes at the P consecutive sampling points.

To evaluate an impact of the receiver on noise distribution, the correspondence between level amplitudes and noise amounts at consecutive sampling points may be obtained based on the equalization parameter. For example, the correspondence between level amplitudes and noise amounts at consecutive sampling points may be a look-up table related to a level amplitude and noise existing after equalization, and different noise amounts are assigned to sampled electrical signals at different level amplitudes based on the look-up table.

For example, after the equalizer in the receiver performs time-domain equalization processing on the sampled electrical signal, noise at the $n^{th}$ sampling point $y(n)$ may be discretized in time domain as follows:

$$noise_{eq}(n) = \sqrt{\sum_{m=-\frac{L-1}{2}}^{\frac{L-1}{2}} |noise(n-m) \cdot h_{eq}(m)|^2}$$

where $noise(n)$ is noise existing before equalization, and is related to a power $y(n)$ of a received signal, $noise_{eq}(n)$ is noise existing after equalization, L is the tap length of the equalizer, and $h_{eq}(n)$ is the tap coefficient of the equalizer. It is assumed that only noise corresponding to P consecutive intermediate sampling points of the equalizer is considered, and the P consecutive sampling points may also be referred to as P cursors. In this case, noise $noise(n)$ corresponding to sampling points on two sides of the P consecutive sampling points may be simplified as $\sigma_{average}$. In this case, the formula in step C212 is used. Because $noise(n-m)$ depends on a level amplitude, in an actual application scenario, only a look-up table related to a level amplitude and $noise_{eq}(n)$ needs to be established. The level amplitude is quantized to obtain W levels, and a look-up table whose depth is P is established based on $h_{eq}(n)$ and according to the formula in step C212, and the table includes a total of $W^P$ search items. The look-up table is shown by Table 1 below.

TABLE 1

Look-up table related to a level amplitude and a noise amount

| Search item sequence number | Levels at P consecutive sampling points | Noise amount |
|---|---|---|
| 1 | $level_1$ $level_1$ ... $level_1$ $level_1$ | $noise_1$ |
| 2 | $level_1$ $level_1$ ... $level_1$ $level_2$ | $noise_2$ |
| 3 | $level_1$ $level_1$ ... $level_1$ $level_3$ | $noise_3$ |
| ... | | |
| W + 1 | $level_1$ $level_1$ ... $level_2$ $level_1$ | $noise_{W+1}$ |
| W + 2 | $level_1$ $level_1$ ... $level_2$ $level_2$ | $noise_{W+2}$ |
| W + 3 | $level_1$ $level_1$ ... $level_2$ $level_3$ | $noise_{W+3}$ |
| ... | | |
| $W^P - 1$ | $level_W$ $level_W$ ... $level_W$ $level_{W-1}$ | $noise_{W^P-1}$ |
| $W^P$ | $level_W$ $level_W$ ... $level_W$ $level_W$ | $noise_{W^P}$ |

Based on the foregoing Table 1, in this embodiment of this application, noise distribution may be changed in the following two manners. For example, different noise amounts may be assigned to sampling signals at different level amplitudes based on the foregoing Table 1, to change noise distribution. For another example, the initial noise ratio parameter M may be modified, to change noise distribution. For example, in the subsequent step C23, the initial noise ratio parameter M is modified. It is assumed that noise corresponding to a level 1 is the third noise amount $noise_{W^P}$, and noise corresponding to a level 0 is the fourth noise amount $noise_1$. Therefore, the modified noise ratio parameter may be obtained by using a ratio of the third noise amount $noise_{W^P}$ to the fourth noise amount $noise_1$.

In step C22, after the correspondence between level amplitudes and noise amounts at consecutive sampling points is established, the third noise amount corresponding to the electrical signal at the maximum level and the fourth noise amount corresponding to the electrical signal at the minimum level may be determined by searching the correspondence. The third noise amount is a noise amount that corresponds to the electrical signal at the maximum level and that is found based on the correspondence between level amplitudes and noise amounts at consecutive sampling points, and the fourth noise amount is a noise amount that corresponds to the electrical signal at the minimum level and that is found based on the correspondence between level amplitudes and noise amounts at consecutive sampling points.

In step C23, after the sampled electrical signal is further processed by the equalizer, the equalized electrical signal is output. Due to the time-domain convolution function of the equalizer, noise corresponding to the maximum level and the minimum level is averaged, and a ratio of the maximum noise amount to the minimum noise amount is less than the foregoing initial noise ratio parameter M. Therefore, after the sampled electrical signal is processed by the equalizer, the foregoing initial noise ratio parameter needs to be modified based on the equalization parameter, that is, the initial noise ratio parameter is modified based on the third noise amount and the fourth noise amount, to obtain the modified noise ratio parameter.

For example, the modifying the initial noise ratio parameter based on the third noise amount and the fourth noise amount, to obtain a modified noise ratio parameter may be implemented in the following manner:

$$M' = \frac{noise_{W^P}}{noise_1}$$

where the third noise amount corresponding to the maximum level is $noise_{W^P}$, the fourth noise amount corresponding to the minimum level is $noise_1$, and the modified noise ratio parameter is M'.

In step C24, the equalizer performs time-domain equalization processing on the sampled electrical signal to obtain the equalized electrical signal. Different equalizers have different noise enhancement degrees. Therefore, a noise enhancement factor may be further obtained based on the equalization parameter, and the noise enhancement factor may be used to measure a noise enhancement degree of a currently used equalizer.

In step C25, the average optical power corresponding to the sampled electrical signal further needs to be determined, and the average optical power is an average value of optical powers of the sampled electrical signal at different level amplitudes. For example, in subsequent embodiments, $P_{th}$ or $P_{ave}$ represents the average optical power. The first noise amount corresponding to the equalized electrical signal may be obtained based on the obtained level amplitude of the sampled electrical signal, the modified noise ratio parameter, the noise enhancement factor, and the average optical power. Because the equalization parameter of the equalizer may be used to determine the modified noise ratio parameter and the noise enhancement factor, the level amplitude of the sampled electrical signal, the modified noise ratio parameter, the noise enhancement factor, and the average optical power may be used to obtain the first noise amount corresponding to the equalized electrical signal. The first noise amount corresponding to the equalized electrical signal is used as a transmitter test parameter, so that optical power attenuation of a signal due to noise when an equalizer is used in the receiver can be simulated, to reflect actual performance of the transmitter. In this embodiment of this application, noise amounts corresponding to sampled electrical signals at different level amplitudes are different, that is, the noise amount corresponding to the level amplitude of the sampled electrical signal may be obtained. Therefore, this solution is applicable to different types of receivers. A type of a receiver that performs a consistency test on a transmitter by using a transmitter test parameter is not limited in this embodiment of this application.

In some embodiments of this application, step C25 of obtaining the first noise amount corresponding to the equalized electrical signal based on the level amplitude of the sampled electrical signal, the modified noise ratio parameter, the noise enhancement factor, and an average optical power includes:

C251. Calculate the first noise amount $\sigma_{DUT\_estimated}$ corresponding to the equalized electrical signal in the following manner:

$$\frac{1}{2}\left(\frac{\int f_u(y) \cdot Q\left(\frac{y - P_{th}}{M(y) \cdot C_{eq}\sigma_{DUT\_estimated}}\right)dy}{\int f_u(y)dy}\right) +$$

-continued $$\frac{1}{2}\left(\frac{\int f_l(y) \cdot Q\left(\frac{P_{th} - y}{M(y) \cdot C_{eq}\sigma_{DUT\_estimated}}\right)dy}{\int f_l(y)dy}\right) = BER_{target}$$

where y represents a signal power collected at a sampling point at which the sampled electrical signal is located, $P_{th}$ represents the average optical power, $f_u(y)$ is amplitude distribution at a sampling point at which an optical power is greater than $P_{th}$, $f_l(Y)$ is amplitude distribution at a sampling point at which an optical power is less than $P_{th}$, M(y) represents the modified noise ratio parameter, $C_{eq}$ is the noise enhancement factor, $BER_{target}$ is a bit error rate threshold, and Q represents a tail function with standard normal distribution.

The foregoing formula may be established by using a Gaussian noise model, bit error determining is performed through forward error correction (FEC), a specified bit error rate threshold is represented as $BER_{target}$, the first noise amount $\sigma_{DUT\_estimated}$ corresponding to the equalized electrical signal meets the formula in step C251, and the first noise amount $\sigma_{DUT}$_estimated corresponding to the equalized electrical signal may be output by using the foregoing formula in step C251. No limitation is imposed. In this embodiment of this application, the foregoing formula, in step C251, for calculating the first noise amount $\sigma_{DUT}$_estimated corresponding to the equalized electrical signal may impose no limitation, and the first noise amount $\sigma_{DUT}$_estimated may be calculated based on an equivalent variant or equation transformation of the foregoing formula in step C251.

403. Obtain a second noise amount corresponding to an ideal electrical signal based on the initial noise ratio parameter and a level amplitude of the ideal electrical signal, where the ideal electrical signal has a same optical modulation amplitude as the sampled electrical signal, and the level amplitude of the ideal electrical signal is the maximum level or the minimum level.

In this embodiment of this application, there is no logical sequence between step 402 and step 403. Step 402 may be performed before step 403, or step 403 may be performed before step 402, or step 402 and step 403 may be performed at the same time. This is not limited herein.

In this embodiment of this application, the preset initial noise ratio parameter is obtained. The initial noise ratio parameter is the ratio of the maximum noise amount to the minimum noise amount. The maximum noise amount is a noise amount corresponding to the electrical signal at the maximum level, for example, the maximum level may be 1. The minimum noise amount is a noise amount corresponding to the electrical signal at the minimum level, for example, the minimum level may be 0. The maximum noise amount and the minimum noise amount may be determined based on an electric signal at a predetermined maximum level and an electric signal at a predetermined minimum level. After the maximum noise amount and the minimum noise amount are determined, the preset initial noise ratio parameter may be determined.

In this embodiment of this application, the ideal electrical signal is determined based on an optical modulation amplitude of the sampled electrical signal. In this case, the ideal electrical signal is a virtual signal that has a same optical modulation amplitude (OMA) as the to-be-tested sampled electrical signal, and the level amplitude of the ideal electrical signal may be the maximum level or the minimum level, that is, the level amplitude of the ideal electrical signal is not a level value between the maximum level and the minimum level. The second noise amount corresponding to the ideal electrical signal is obtained based on the initial noise ratio parameter and the level amplitude of the ideal electrical signal. The second noise amount is a noise amount corresponding to the ideal electrical signal, and the second noise amount is a maximum tolerable-noise amount of the ideal electrical signal.

In some embodiments of this application, step 403 of obtaining a second noise amount corresponding to an ideal electrical signal based on the initial noise ratio parameter and a level amplitude of the ideal electrical signal includes:

calculating the second noise amount $\sigma_{ideal_{estimated}}$ corresponding to the ideal electrical signal in the following manner:

$$\frac{1}{2}Q\left(\frac{y - P_{th}}{M \cdot \sigma_{ideal\_estimated}}\right) + \frac{1}{2}Q\left(\frac{P_{th} - y}{\sigma_{ideal\_estimated}}\right) = BER_{target}$$

where y represents a signal power collected at a sampling point at which the ideal electrical signal is located, $P_{th}$ represents an average optical power, the average optical power is an average value of optical powers of the ideal electrical signal at different level amplitudes, M represents the initial noise ratio parameter, $BER_{target}$ is a bit error rate threshold, and Q represents a tail function with standard normal distribution.

Specifically, the average optical power corresponding to the ideal electrical signal further needs to be determined, and the average optical power is an average value of optical powers of the ideal electrical signal at different level amplitudes. For example, in subsequent embodiments, $P_{th}$ or $P_{ave}$ represents the average optical power. Based on the obtained initial noise ratio parameter and the level amplitude of the ideal electrical signal, the second noise amount $\sigma_{ideal_{estimated}}$ corresponding to the ideal electrical signal may be obtained, and the second noise amount $\sigma_{ideal_{estimated}}$ may be used for a subsequent consistency test on the transmitter.

In this embodiment of this application, after the first noise amount corresponding to the sampled electrical signal is obtained by using the foregoing step 402, and the second noise amount corresponding to the ideal electrical signal is obtained by using the foregoing step 403, the first noise amount and the second noise amount may be used to perform a consistency test on the transmitter. A TDEC or TDECQ test method may be used to perform a consistency test on the transmitter, to obtain a final transmitter consistency test result by using the first noise amount and the second noise amount.

In some embodiments of this application, the method provided in this embodiment of this application may further include the following steps.

D1. Calculate a transmitter and dispersion eye closure penalty by using the first noise amount and the second noise amount.

The first noise amount and the second noise amount are used to perform a consistency test on the transmitter. For example, a TDEC or TDECQ test method may be used to perform a consistency test on the transmitter. In subsequent embodiments, calculation of TDEC is used as an example. In this case, the calculated TDEC result may be used as a transmitter consistency test result.

For example, in some embodiments of this application, step D1 of calculating a transmitter and dispersion eye closure penalty by using the first noise amount and the second noise amount includes:

D11. Calculate the transmitter and dispersion eye closure penalty $TDEC_{calculated}$ in the following manner:

$$TDEC_{calculated} = \frac{\sigma_{DUT}}{\sigma_{ideal}}$$

where $\sigma_{DUT}$ represents the first noise amount, and $\sigma_{ideal}$ represents the second noise amount.

Specifically, the transmitter and dispersion eye closure penalty may be expressed as $TDEC_{calculated}$, the transmitter and dispersion eye closure penalty $TDEC_{calculated}$ may be calculated by using the foregoing formula in step D11, and the calculated TDEC result may be used as a transmitter consistency test result. No limitation is imposed. In this embodiment of this application, the foregoing formula, in step D11, for calculating the transmitter and dispersion eye closure penalty $TDEC_{calculated}$ may impose no limitation, and the transmitter and dispersion eye closure penalty $TDEC_{calculated}$ may be calculated based on an equivalent variant or equation transformation of the foregoing formula in step D11.

In some embodiments of this application, in an implementation scenario in which step D1 or DI1 is performed, the method provided in this embodiment of this application may further include the following steps:

E1. When the bit error rate threshold is used, obtain noise amounts respectively corresponding to the sampled electrical signal and the ideal electrical signal.

E2. Obtain a modification relationship between a transmitter and dispersion eye closure penalty and a noise amount based on the noise amounts that respectively correspond to the sampled electrical signal and the ideal electrical signal and that are obtained when the bit error rate threshold is used.

E3. Modify the calculated transmitter and dispersion eye closure penalty $TDEC_{calculated}$ in the following manner:

$$TDEC_{actual} = TDEC_{calculated} f(TDEC_{actual}, TDEC_{calculated})$$

where $TDEC_{actual}$ represents a modified transmitter and dispersion eye closure penalty, and $f(TDEC_{actual}, TDEC_{calculated})$ represents the modification relationship between a transmitter and dispersion eye closure penalty and a noise amount.

Specifically, to evaluate an impact on noise distribution, the modification relationship between a transmitter and dispersion eye closure penalty and a noise amount is obtained based on the noise amounts that respectively correspond to the sampled electrical signal and the ideal electrical signal and that are obtained when the bit error rate threshold is used. For example, the modification relationship between a transmitter and dispersion eye closure penalty and a noise amount may be a TDEC modification look-up table, and different modification values are assigned to different transmitter and dispersion eye closure penalties $TDEC_{calculated}$ based on the look-up table.

For example, the TDEC test method is used to perform a consistency test on the transmitter, and a sensitivity (power) penalty can be evaluated by using the TDEC test method. The sensitivity penalty is a difference between tolerable optical power attenuation of the to-be-tested sampled electrical signal and tolerable optical power attenuation of the ideal electrical signal in case of a forward error correction (FEC) bit error rate threshold. In the TDEC test method, optical power attenuation of a signal is simulated by adding noise to the signal. For the PIN receiver, a total noise amount does not change with an optical power due to limited thermal noise. Therefore, adding noise by n times is equivalent to reducing the optical power by n times. This manner is applicable to the PIN receiver that is dominant by thermal noise. However, in the APD receiver, noise addition is not equivalent to optical power attenuation. For the APD receiver, due to an impact of shot noise, reducing the optical power also reduces the total noise amount. Therefore, adding noise by n times is not equivalent to reducing the optical power by n times. Therefore, in this embodiment of this application, a TDEC modification method needs to be determined based on a relationship between optical power attenuation and noise amount addition. First, two physical processes, namely, optical power attenuation and noise amount addition, are separately described by using a mathematical model.

When a signal y(t) is attenuated by $\beta_{DUT}$, due to Gaussian noise distribution, the following mathematical model may be used to represent an optical power attenuation model:

$$\frac{1}{2}\left(\frac{\int f_u(y) \cdot Q\left(\frac{y/\beta_{DUT} - P_{ave}}{M\sigma_{DUT}}\right) dy}{\int f_u(y) dy}\right) +$$

$$\frac{1}{2}\left(\frac{\int f_l(y) \cdot Q\left(\frac{P_{ave} - y/\beta_{DUT}}{\sigma_{DUT}}\right) dy}{\int f_l(y) dy}\right) = BER_{target}$$

where $\sigma_{DUT}$ is actual noise in a system, $\beta_{DUT}$ is a signal attenuation coefficient, $f_u(y)$ is amplitude distribution at a sampling point at which an amplitude is greater than $P_{ave}$, $f_l(y)$ is amplitude distribution at a sampling point at which an amplitude is less than $P_{ave}$, and $P_{ave}$ represents an average optical power.

When $\sigma_{DUT\_estimated}$ noise is added to the signal y(t), the following mathematical model may be used to represent a noise addition model:

$$\frac{1}{2}\left(\frac{\int f_u(y) \cdot Q\left(\frac{y - P_{th}}{M\sigma_{DUT\_estimated}}\right) dy}{\int f_u(y) dy}\right) +$$

$$\frac{1}{2}\left(\frac{\int f_l(y) \cdot Q\left(\frac{P_{th} - y}{\sigma_{DUT\_estimated}}\right) dy}{\int f_l(y) dy}\right) = BER_{target}$$

Based on the foregoing two formulas, for the to-be-tested sampled electrical signal, the relationship between optical power attenuation and noise amount addition is as follows:

$$\beta_{DUT}\sigma_{DUT} = \sigma_{DUT\_estimated}$$

where $\sigma_{DUT}$ is noise existing after the sampled electrical signal is received, $\beta_{DUT}$ is a signal attenuation coefficient of the sampled electrical signal, and $\sigma_{DUT\_estimated}$ is an estimate of a tolerable-noise amount of the sampled electrical signal.

For the ideal electrical signal, the relationship between optical power attenuation and noise amount addition is as follows:

$$\beta_{ideal}\sigma_{ideal} = \sigma_{ideal\_estimated}$$

where $\sigma_{ideal}$ is noise existing after the ideal electrical signal is received, $\beta_{ideal}$ is a signal attenuation coefficient of the ideal electrical signal, and $\sigma_{ideal\_estimated}$ is an estimate of a tolerable-noise amount of the ideal electrical signal.

Therefore, an actual TDEC value is as follows:

$$TDEC_{actual} = \frac{\beta_{ideal}}{\beta_{DUT}} = \frac{\sigma_{ideal\_estimated}\sigma_{DUT}}{\sigma_{DUT\_estimated}\sigma_{ideal}} = TDEC_{calculated}\frac{\sigma_{DUT}}{\sigma_{ideal}}$$

where $\sigma_{DUT}$ and $\sigma_{ideal}$ are respectively noise amounts that respectively correspond to the to-be-tested sampled electrical signal and the ideal electrical signal and that exist when the FEC bit error threshold is 1e−2. Because optical powers of the ideal electrical signal and the to-be-tested sampled electrical signal are different when the bit error threshold is 1e−2, $\sigma_{DUT}$ and $\sigma_{ideal}$ are different, and the calculated TDEC value needs to be modified by estimating a value of $$\frac{\sigma_{DUT}}{\sigma_{ideal}}.$$

In this embodiment of this application, the value of $$\frac{\sigma_{DUT}}{\sigma_{ideal}}$$

is estimated by using a look-up table. The look-up table is shown by Table 2 below.

TABLE 2

TDEC modification look-up table

| $TDEC_{calculated}$ | $\frac{\sigma_{DUT}}{\sigma_{ideal}}$ |
|---|---|
| 1 dB | 1.1 |
| 2 dB | 1.2 |
| ... | ... |

In the table, $$\frac{\sigma_{DUT}}{\sigma_{ideal}}$$

is related to $TDEC_{actual}$ and $TDEC_{calculated}$. Therefore, the modification relationship between a transmitter and dispersion eye closure penalty and a noise amount may be represented as $f(TDEC_{actual}, TDEC_{calculated})$. The transmitter and dispersion eye closure penalty $TDEC_{calculated}$ may be modified by using the formula in step E3.

It may be learned from the example descriptions in the foregoing embodiment that, waveform sampling is performed on the optical signal sent by the transmitter, to obtain the sampled electrical signal; the first noise amount corresponding to the sampled electrical signal is obtained based on the preset initial noise ratio parameter and the level amplitude of the sampled electrical signal, where the level amplitude of the sampled electrical signal is greater than the minimum level and less than the maximum level, the initial noise ratio parameter is the ratio of the maximum noise amount to the minimum noise amount, the maximum noise amount is a noise amount corresponding to the electrical signal at the maximum level, the minimum noise amount is a noise amount corresponding to the electrical signal at the minimum level, and the first noise amount is a noise amount that is greater than the minimum noise amount and less than the maximum noise amount; and the second noise amount corresponding to the ideal electrical signal is obtained based on the initial noise ratio parameter and the level amplitude of the ideal electrical signal, where the ideal electrical signal has a same optical modulation amplitude as the sampled electrical signal, and the level amplitude of the ideal electrical signal is the maximum level or the minimum level, where the first noise amount and the second noise amount are used to perform a consistency test on the transmitter. In this embodiment of this application, the first noise amount corresponding to the sampled electrical signal may be obtained based on the preset initial noise ratio parameter and the level amplitude of the sampled electrical signal, and the determined first noise amount is a noise amount that is greater than the minimum noise amount and less than the maximum noise amount. Therefore, in this embodiment of this application, noise amounts corresponding to sampled electrical signals at different level amplitudes are different, that is, the noise amount corresponding to the level amplitude of the sampled electrical signal may be obtained. Therefore, this solution is applicable to different types of receivers. A type of a receiver that performs a consistency test on a transmitter by using a transmitter test parameter is not limited in this embodiment of this application.

To better understand and implement the foregoing solutions in the embodiments of this application, the following provides detailed descriptions by using an example of a corresponding application scenario.

Figure 6:
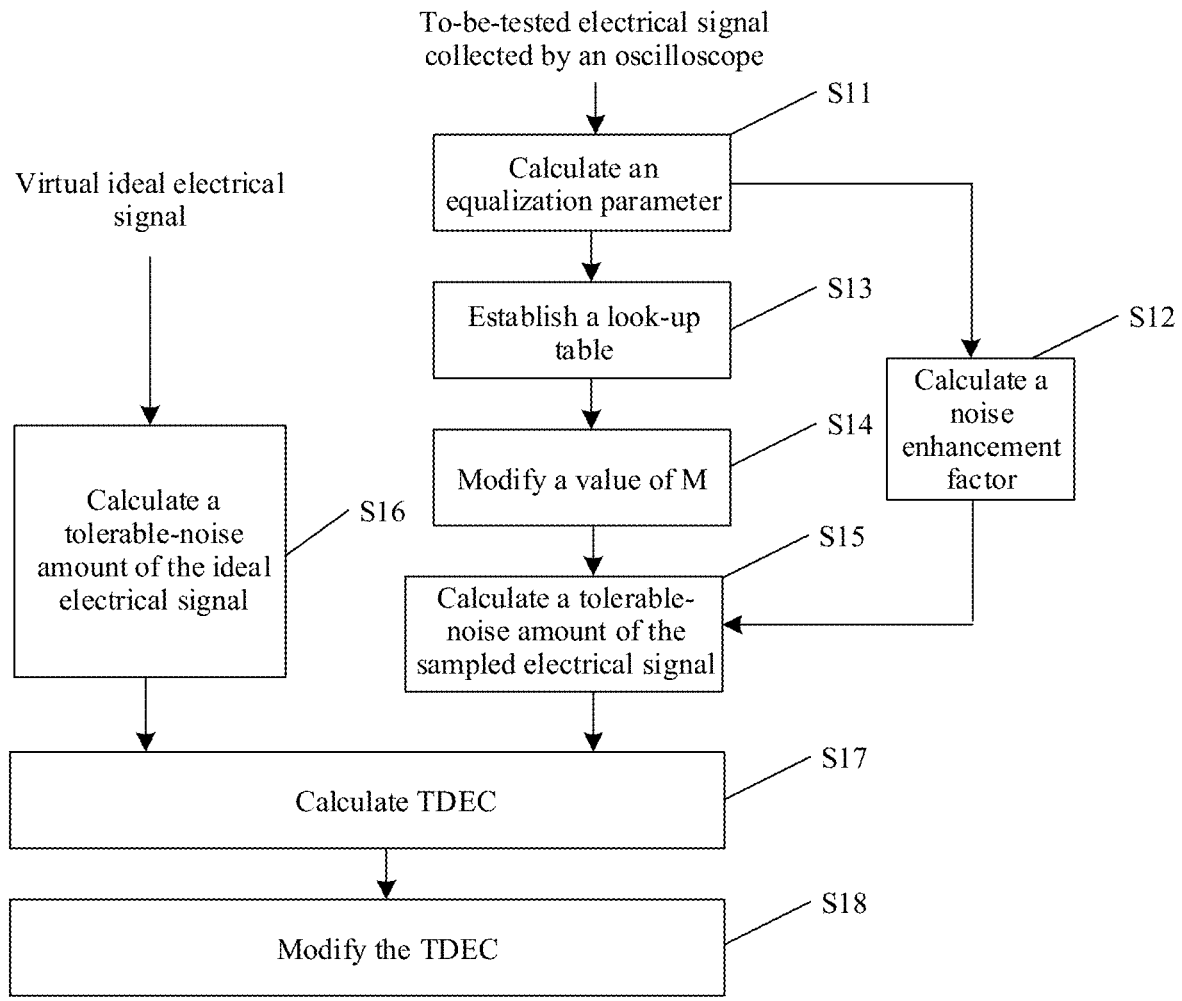
FIG. 6 is a flowchart of calculating and modifying TDEC according to an embodiment of this application.

In this embodiment of this application, an example in which the receiver performs a TDEC test method is used. After the oscilloscope in the receiver collects a sampled electrical signal, the receiver obtains data such as a level amplitude of the sampled electrical signal, an initial noise ratio parameter, and an average optical power, and then calculates TDEC. FIG. 6 is a flowchart of calculating and modifying TDEC according to an embodiment of this application. The following procedures are mainly included.

S11. The receiver calculates an equalization parameter.

The equalization parameter may include a tap length and a tap coefficient of the equalizer.

S12. The receiver calculates a noise enhancement factor $C_{eq}$.

The receiver may calculate the noise enhancement factor $C_{eq}$ in the following manner:

$$C_{eq} = \sqrt{\int N(f) \times |H_{eq}(f)|^2 df}$$

where $N(f)$ is spectrum distribution of Gaussian white noise, and $H_{eq}(f)$ is a frequency-domain representation of the equalizer.

S13. The receiver establishes a look-up table.

For example, a look-up table shown by the foregoing Table 1 is established.

S14. The receiver modifies a value of M.

The receiver may modify the initial noise ratio parameter M by using a third noise amount and a fourth noise amount that are obtained by using the foregoing Table 1.

For example, a look-up table related to a level amplitude and noise is established based on the equalization parameter, the value of M is modified, and the modified $$M = \frac{noise_{WP}}{noise_1}.$$

S15. The receiver calculates a tolerable-noise amount of the sampled electrical signal.

The tolerable-noise amount $\sigma_{DUT}$ of the to-be-tested signal is calculated, and noise is added to the to-be-tested signal (which is increased by a value of $\sigma_{DUT\_estimated}$), so that the following equation is valid, where $BER_{target}$ is a bit error rate threshold tolerated by a system:

$$\frac{1}{2}\left(\frac{\int f_u(y) \cdot Q\left(\frac{y - P_{th}}{M(y) \cdot C_{eq}\sigma_{DUT\_estimated}}\right)dy}{\int f_u(y)dy}\right) +$$

$$\frac{1}{2}\left(\frac{\int f_1(y) \cdot Q\left(\frac{P_{th} - y}{M(y) \cdot C_{eq}\sigma_{DUT\_estimated}}\right)dy}{\int f_1(y)dy}\right) = BER_{target}$$

In this case, $\sigma_{DUT\_estimated}$ is $\sigma_{DUT}$.

S16. The receiver calculates a tolerable-noise amount of an ideal electrical signal.

The tolerable-noise amount $\sigma_{ideal}$ of the ideal electrical signal is calculated, and noise is added to the ideal electrical signal (which is increased by a value of $\sigma_{ideal\_estimated}$), so that the following equation is valid, where $BER_{target}$ is the bit error rate threshold tolerated by the system:

$$\frac{1}{2}Q\left(\frac{y - P_{th}}{M \cdot \sigma_{ideal\_estimated}}\right) + \frac{1}{2}Q\left(\frac{P_{th} - y}{\sigma_{ideal\_estimated}}\right) = BER_{target}$$

In this case, $\sigma_{ideal\_estimated}$ is $\sigma_{ideal}$.

S17. The receiver calculates the TDEC.

$TDEC_{calculated}$ is calculated in the following manner:

$$TDEC_{calcuated} = \frac{\sigma_{DUT}}{\sigma_{ideal}}$$

S18. The receiver modifies the TDEC.

For example, the modified $TDEC_{actual}$ is calculated based on the foregoing Table 2:

$$TDEC_{actual} = TDEC_{calculated} f(TDEC_{actual}, TDEC_{calculated})$$

It may be learned from the example descriptions in this embodiment of this application that, in a scenario of the APD receiver, a solution for calculating and modifying the TDEC is proposed in this embodiment of this application. The solution may be applied to a scenario in which the APD receiver is used, for example, an access network or 40 km short-range optical transmission.

Specifically, in this embodiment of this application, for the TDEC, a noise tolerance capability of a signal is evaluated based on a method in which noise is added to a signal. Therefore, in this embodiment of this application, a corresponding noise amount is determined based on a level amplitude of an electrical signal at a sampling point, and a noise amount corresponding to the electrical signal at the sampling point is calculated through interpolation. In the TDEC test method, in addition to enhancing noise, the equalizer also affects noise distribution of the APD receiver. In this embodiment of this application, it is proposed to evaluate an impact of the equalizer on the noise distribution of the APD receiver by using a look-up table, and a look-up table shown by the foregoing Table 1 is established by calculating noise in time domain. In the APD receiver, reducing the optical power is not equivalent to adding noise. In this embodiment of this application, a relationship between optical power reduction and noise addition is established. Based on the relationship, a solution for modifying the TDEC is proposed. The modified TDEC can be used to simulate optical power attenuation of a signal due to noise when an equalizer is used in the receiver, to reflect actual performance of the transmitter.

It should be noted that, for brief description, the foregoing method embodiments are represented as a combination of a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to embodiments, and the involved actions and modules are not necessarily required in this application.

To better implement the foregoing solutions in the embodiments of this application, the following further provides related apparatuses configured to implement the foregoing solutions.

Figure 7:
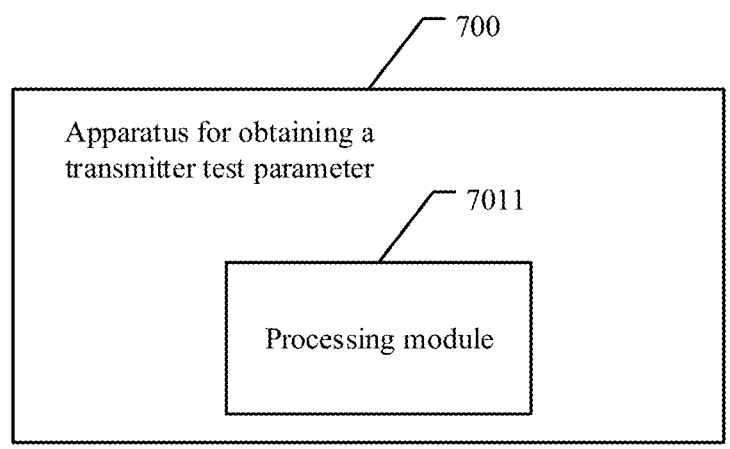
FIG. 7 is a schematic diagram of composition of an apparatus for obtaining a transmitter test parameter according to an embodiment of this application.

Refer to FIG. 7. An apparatus 700 for obtaining a transmitter test parameter provided in an embodiment of this application may include a processing module 701.

The processing module is configured to perform waveform sampling on an optical signal sent by a transmitter, to obtain a sampled electrical signal.

The processing module is configured to obtain a first noise amount corresponding to the sampled electrical signal based on a preset initial noise ratio parameter and a level amplitude of the sampled electrical signal, where the level amplitude of the sampled electrical signal is greater than a minimum level and less than a maximum level, the initial noise ratio parameter is a ratio of a maximum noise amount to a minimum noise amount, the maximum noise amount is a noise amount corresponding to an electrical signal at the maximum level, the minimum noise amount is a noise amount corresponding to an electrical signal at the minimum level, and the first noise amount is a noise amount that is greater than the minimum noise amount and less than the maximum noise amount.

The processing module is configured to obtain a second noise amount corresponding to an ideal electrical signal based on the initial noise ratio parameter and a level amplitude of the ideal electrical signal, where the ideal electrical signal has a same optical modulation amplitude as the sampled electrical signal, and the level amplitude of the ideal electrical signal is the maximum level or the minimum level.

The first noise amount and the second noise amount are used to perform a consistency test on the transmitter.

In some embodiments of this application, the processing module is further configured to: determine that the level amplitude of the sampled electrical signal is between the maximum level and the minimum level; and use the maximum noise amount and the minimum noise amount as an interpolation condition, and perform interpolation calculation on the level amplitude of the sampled electrical signal based on the initial noise ratio parameter, to obtain the first noise amount.

In some embodiments of this application, the processing module is further configured to: obtain a tolerable-noise amount $\sigma_G$ of the sampled electrical signal at a preset sampling point; determine maximum noise $\sigma_{max}$ corresponding to the electrical signal at the maximum level in the following manner: $\sigma_{max}=M\sigma_G$, where M represents the initial noise ratio parameter; determine the minimum noise amount corresponding to the electrical signal at the minimum level is $\sigma_G$; perform quantization between the maximum level and the minimum level to obtain N level values, where the N level values are all between the maximum level and the minimum level, and N is a positive integer; calculate N noise amounts respectively corresponding to the N level values according to a preset interpolation algorithm; determine that the level amplitude of the sampled electrical signal is a first level value in the N level values; and obtain a first noise amount corresponding to the first level value based on a correspondence between the N level values and the N noise amounts.

In some embodiments of this application, the processing module is further configured to: obtain a correspondence between a level amplitude and a noise amount based on the preset initial noise ratio parameter, the maximum noise amount, and the minimum noise amount, where the correspondence between a level amplitude and a noise amount includes a noise amount corresponding to each level amplitude that is greater than the minimum level and less than the maximum level; and search the correspondence between a level amplitude and a noise amount by using the level amplitude of the sampled electrical signal, to obtain the first noise amount.

In some embodiments of this application, the processing module is further configured to: after performing waveform sampling on the optical signal to obtain the sampled electrical signal, perform time-domain equalization processing on the sampled electrical signal by using an equalizer, to obtain an equalized electrical signal.

In some embodiments of this application, the processing module is further configured to: obtain an equalization parameter corresponding to the equalizer, where the equalization parameter includes a tap length of the equalizer and a tap coefficient of the equalizer; and obtain a first noise amount corresponding to the equalized electrical signal based on the level amplitude of the sampled electrical signal, the equalization parameter, and the initial noise ratio parameter.

In some embodiments of this application, the processing module is further configured to: obtain a correspondence between level amplitudes and noise amounts at consecutive sampling points based on the level amplitude of the sampled electrical signal, the equalization parameter, and the initial noise ratio parameter; determine a third noise amount corresponding to the electrical signal at the maximum level and a fourth noise amount corresponding to the electrical signal at the minimum level based on the correspondence between level amplitudes and noise amounts at consecutive sampling points; modify the initial noise ratio parameter based on the third noise amount and the fourth noise amount, to obtain a modified noise ratio parameter; obtain a noise enhancement factor based on the equalization parameter, where the noise enhancement factor is used to represent a noise enhancement degree of the equalizer; and obtain the first noise amount corresponding to the equalized electrical signal based on the level amplitude of the sampled electrical signal, the modified noise ratio parameter, the noise enhancement factor, and an average optical power, where the average optical power is an average value of optical powers of the sampled electrical signal at different level amplitudes.

In some embodiments of this application, the processing module is further configured to calculate the first noise amount $\sigma_{DUT\_estimated}$ corresponding to the equalized electrical signal in the following manner:

$$\frac{1}{2}\left(\frac{\int f_u(y)\cdot Q\left(\frac{y-P_{th}}{M(y)\cdot C_{eq}\sigma_{DUT\_estimated}}\right)dy}{\int f_u(y)dy}\right) +$$

$$\frac{1}{2}\left(\frac{\int f_l(y)\cdot Q\left(\frac{P_{th}-y}{M(y)\cdot C_{eq}\sigma_{DUT\_estimated}}\right)dy}{\int f_l(y)dy}\right) = BER_{target}$$

where y represents a signal power collected at a sampling point at which the sampled electrical signal is located, $P_{th}$ represents the average optical power, $f_u(y)$ is amplitude distribution at a sampling point at which an optical power is greater than $P_{th}$, $f_l(y)$ is amplitude distribution at a sampling point at which an optical power is less than $P_{th}$, $M(y)$ represents the modified noise ratio parameter, $C_{eq}$ is the noise enhancement factor, $BER_{target}$ is a bit error rate threshold, and Q represents a tail function with standard normal distribution.

In some embodiments of this application, the processing module is further configured to: determine P consecutive sampling points corresponding to P taps in the equalizer, where a value of P is a positive integer; and calculate, in the following manner, a noise amount $noise_{eq}(n)$ that is at an $n^{th}$ sampling point and that exists after equalization:

$$noise_{eq}(n) =$$

$$\sqrt{\sum_{m=-\frac{P-1}{2}}^{\frac{P-1}{2}}|noise\ (n-m)\cdot h_{eq}(m)|^2 + \sum_{\substack{m=-\frac{L-1}{2} \\ m\notin[-\frac{P-1}{2},\frac{P-1}{2}]}}^{\frac{L-1}{2}}|\sigma_{average}\cdot h_{eq}(m)|^2}$$

where L represents the tap length of the equalizer, $h_{eq}$ represents the tap coefficient of the equalizer, noise(n−m) represents a noise amount that is at an $(n-m)^{th}$ sampling point and that exists before time-domain equalization processing is performed, and $\sigma_{average}$ is an average noise amount at different level amplitudes.

The processing module is further configured to: quantize the level amplitude of the sampled electrical signal to obtain W levels, where W is a positive integer; and obtain the correspondence between level amplitudes and noise amounts at consecutive sampling points based on the calculation manner of $noise_{eq}(n)$, where the correspondence between level amplitudes and noise amounts at consecutive sampling points includes WP noise amounts corresponding to level amplitudes at the P consecutive sampling points.

In some embodiments of this application, the processing module is further configured to calculate the second noise amount $\sigma_{ideal\_estimated}$ corresponding to the ideal electrical signal in the following manner:

$$\frac{1}{2}Q\left(\frac{y-P_{th}}{M\cdot\sigma_{ideal\_estimated}}\right) + \frac{1}{2}Q\left(\frac{P_{th}-y}{\sigma_{ideal\_estimated}}\right) = BER_{target}$$

where y represents a signal power collected at a sampling point at which the ideal electrical signal is located, $P_{th}$ represents an average optical power, the average optical power is an average value of optical powers of the ideal electrical signal at different level amplitudes, M represents the initial noise ratio parameter, $BER_{target}$ is a bit error rate threshold, and Q represents a tail function with standard normal distribution.

In some embodiments of this application, the processing module is further configured to calculate a transmitter and dispersion eye closure penalty by using the first noise amount and the second noise amount.

In some embodiments of this application, the processing module is further configured to calculate the transmitter and dispersion eye closure penalty $TDEC_{calculated}$ in the following manner:

$$TDEC_{calcuated} = \frac{\sigma_{DUT}}{\sigma_{ideal}}$$

where $\sigma_{DUT}$ represents the first noise amount, and $\sigma_{ideal}$ represents the second noise amount.

In some embodiments of this application, the processing module is further configured to: when the bit error rate threshold is used, obtain noise amounts respectively corresponding to the sampled electrical signal and the ideal electrical signal; obtain a modification relationship between a transmitter and dispersion eye closure penalty and a noise amount based on the noise amounts that respectively correspond to the sampled electrical signal and the ideal electrical signal and that are obtained when the bit error rate threshold is used; and modify the calculated transmitter and dispersion eye closure penalty $TDEC_{calculated}$ in the following manner:

$$TDEC_{actual} = TDEC_{calculated} f(TDEC_{actual}, TDEC_{calculated})$$

where $TDEC_{actual}$ represents a modified transmitter and dispersion eye closure penalty, and $f(TDEC_{actual}, TDEC_{calculated})$ represents the modification relationship between a transmitter and dispersion eye closure penalty and a noise amount.

It may be learned from the example descriptions in the foregoing embodiment that, waveform sampling is performed on the optical signal sent by the transmitter, to obtain the sampled electrical signal; the first noise amount corresponding to the sampled electrical signal is obtained based on the preset initial noise ratio parameter and the level amplitude of the sampled electrical signal, where the level amplitude of the sampled electrical signal is greater than the minimum level and less than the maximum level, the initial noise ratio parameter is the ratio of the maximum noise amount to the minimum noise amount, the maximum noise amount is a noise amount corresponding to the electrical signal at the maximum level, the minimum noise amount is a noise amount corresponding to the electrical signal at the minimum level, and the first noise amount is a noise amount that is greater than the minimum noise amount and less than the maximum noise amount; and the second noise amount corresponding to the ideal electrical signal is obtained based on the initial noise ratio parameter and the level amplitude of the ideal electrical signal, where the ideal electrical signal has a same optical modulation amplitude as the sampled electrical signal, and the level amplitude of the ideal electrical signal is the maximum level or the minimum level, where the first noise amount and the second noise amount are used to perform a consistency test on the transmitter. In this embodiment of this application, the first noise amount corresponding to the sampled electrical signal may be obtained based on the preset initial noise ratio parameter and the level amplitude of the sampled electrical signal, and the determined first noise amount is a noise amount that is greater than the minimum noise amount and less than the maximum noise amount. Therefore, in this embodiment of this application, noise amounts corresponding to sampled electrical signals at different level amplitudes are different, that is, a noise amount corresponding to the level amplitude of the sampled electrical signal may be obtained. Therefore, this solution is applicable to different types of apparatuses for obtaining a transmitter test parameter. A type of an apparatus for obtaining a transmitter test parameter that performs a consistency test on a transmitter by using a transmitter test parameter is not limited in this embodiment of this application.

It should be noted that content such as information exchange between the modules/units of the apparatus and the execution processes thereof is based on the same idea as the method embodiments of this application, and therefore brings the same technical effects as the method embodiments of this application. For the specific content, refer to the foregoing descriptions in the method embodiments of this application. Details are not described herein again.

An embodiment of this application further provides a computer storage medium. The computer storage medium stores a program, and execution of the program includes some or all of the steps described in the foregoing method embodiments.

Figure 8:
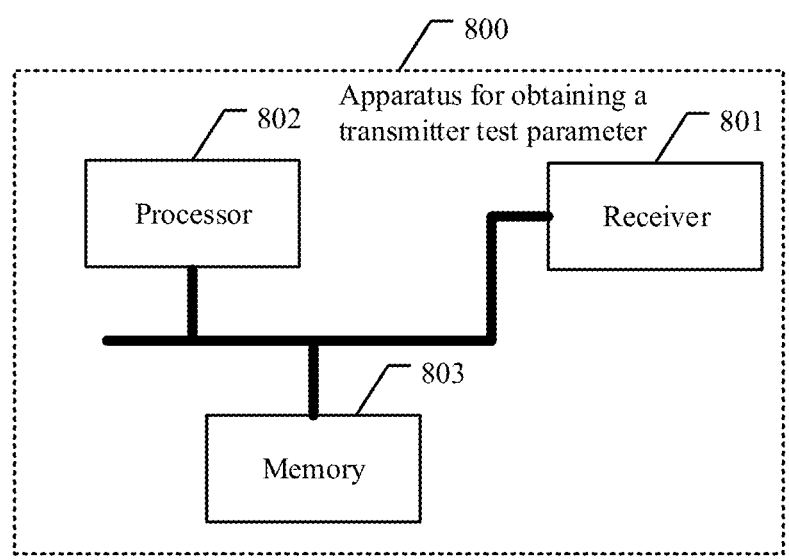
FIG. 8 is a schematic diagram of composition of another apparatus for obtaining a transmitter test parameter according to an embodiment of this application.

The following describes another apparatus for obtaining a transmitter test parameter provided in an embodiment of this application. Refer to FIG. 8. An apparatus 800 for obtaining a transmitter test parameter includes:

a receiver 801, a processor 802, and a memory 803 (there may be one or more processors 802 in the apparatus 800 for obtaining a transmitter test parameter, and one processor is used as an example in FIG. 8). In some embodiments of this application, the receiver 801, the processor 802, and the memory 803 may be connected by using a bus or in another manner. In FIG. 8, an example in which the receiver 801, the processor 802, and the memory 803 are connected by using a bus is used.

The memory 803 may include a read-only memory and a random access memory, and provide instructions and data for the processor 802. Apart of the memory 803 may further include a non-volatile random access memory (NVRAM). The memory 803 stores an operating system and operation instructions, an executable module or a data structure, a subset thereof, or an extended set thereof. The operation instructions may be various operation instructions to implement various operations. The operating system may include various system programs for implementing various basic services and processing hardware-based tasks.

The processor 802 controls an operation of the apparatus for obtaining a transmitter test parameter, and the processor 802 may also be referred to as a central processing unit (CPU). In specific application, components of the apparatus for obtaining a transmitter test parameter are coupled together by using a bus system. In addition to a data bus, the bus system includes a power bus, a control bus, and a status signal bus. However, for clear description, various buses in the figure are referred to as the bus system.

The method disclosed in the embodiments of this application may be applied to the processor 802, or may be implemented by the processor 802. The processor 802 may be an integrated circuit chip and has a signal processing capability. In an implementation process, the steps in the foregoing methods may be implemented by using a hardware integrated logic circuit in the processor 802, or by using instructions in a form of software. The processor 802 may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 803, and the processor 802 reads information in the memory 803 and completes the steps in the foregoing methods in combination with hardware of the processor.

The receiver 801 may be configured to receive an optical signal sent by a transmitter, and generate signal input related to a related setting and function control of the apparatus for obtaining a transmitter test parameter.

In this embodiment of this application, the processor 802 is configured to perform the foregoing method for obtaining a transmitter test parameter.

In another possible design, when the apparatus for obtaining a transmitter test parameter may be a chip, the chip includes a processing unit and a communication unit. The processing unit may be, for example, a processor. The communication unit may be, for example, an input/output interface, a pin, or a circuit. The processing unit may execute computer-executable instructions stored in a storage unit, to enable the chip in the apparatus to perform the wireless communication method according to any implementation of the foregoing first aspect. Optionally, the storage unit is a storage unit in the chip, for example, a register or a buffer; or the storage unit may be alternatively a storage unit outside the chip and in the terminal, for example, a read-only memory (ROM), another type of static storage device that can store static information and instructions, or a random access memory (RAM).

The processor mentioned anywhere may be a general-purpose central processing unit, a microprocessor, an ASIC, or one or more integrated circuits for controlling program execution of the foregoing method for obtaining a transmitter test parameter.

In addition, it should be noted that the described apparatus embodiments are merely examples. The units described as separate parts may or may not be physically separate, and parts displayed as units may or may not be physical units, that is, may be located in one place, or may be distributed on a plurality of network units. Some or all the modules may be selected according to an actual need to achieve the objectives of the solutions of the embodiments. In addition, in the accompanying drawings of the apparatus embodiments provided by this application, connection relationships between modules indicate that the modules have communication connections with each other, which may be specifically implemented as one or more communication buses or signal cables.

Based on the descriptions of the foregoing implementations, a person skilled in the art may clearly understand that this application may be implemented by using software in combination with necessary universal hardware, or certainly, may be implemented by using dedicated hardware, including a dedicated integrated circuit, a dedicated CPU, a dedicated memory, a dedicated component, or the like. Generally, any function that can be completed by using a computer program can be very easily implemented by using corresponding hardware. Moreover, a specific hardware structure used to implement a same function may be in various forms, for example, in a form of an analog circuit, a digital circuit, a dedicated circuit, or the like. However, as for this application, software program implementation is a better implementation in most cases. Based on such an understanding, the technical solutions of this application essentially or the part contributing to the prior art may be implemented in a form of a software product. The software product is stored in a readable storage medium, such as a floppy disk, a USB flash drive, a removable hard disk, a ROM, a RAM, a magnetic disk, or an optical disc of a computer, and includes several instructions for indicating a computer device (which may be a personal computer, a server, a network device, or the like) to perform the methods in the embodiments of this application.

All or some of the foregoing embodiments may be implemented by using software, hardware, firmware, or any combination thereof. When software is used for implementation, all or some of the embodiments may be implemented in a form of a computer program product.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A method for obtaining a transmitter test parameter, wherein the method is applied to a hardware processor of an apparatus, and comprises:
performing waveform sampling on an optical signal sent by a transmitter, to obtain a sampled electrical signal;
obtaining a first noise amount associated with the sampled electrical signal based on a preset initial noise ratio parameter and a level amplitude of the sampled electrical signal, wherein the level amplitude of the sampled electrical signal is greater than a minimum level and less than a maximum level, wherein the preset initial noise ratio parameter is a ratio of a maximum noise amount to a minimum noise amount, wherein the maximum noise amount is a noise amount associated with an electrical signal at the maximum level, wherein the minimum noise amount is a noise amount associated with an electrical signal at the minimum level, and wherein the first noise amount is a noise amount that is greater than the minimum noise amount and less than the maximum noise amount; and obtaining a second noise amount associated with an ideal electrical signal based on the initial noise ratio parameter, a first level amplitude of the ideal electrical signal and a second level amplitude of the ideal electrical signal, wherein an optical modulation amplitude of the ideal electrical signal equals to the optical modulation amplitude of the sampled electrical signal, and wherein the first level amplitude of the ideal electrical signal is the maximum level, the second level amplitude of the ideal electrical signal is the minimum level, wherein the first noise amount and the second noise amount are used to perform a consistency test on the transmitter.

2. The method according to claim 1, wherein obtaining the first noise amount associated with the sampled electrical signal comprises:

determining that the level amplitude of the sampled electrical signal is between the maximum level and the minimum level; and using the maximum noise amount and the minimum noise amount as an interpolation condition, and performing interpolation calculation on the level amplitude of the sampled electrical signal based on the initial noise ratio parameter to obtain the first noise amount.

3. The method according to claim 2, wherein using the maximum noise amount and the minimum noise amount as the interpolation condition, and performing the interpolation calculation on the level amplitude of the sampled electrical signal based on the initial noise ratio parameter to obtain the first noise amount comprise:

obtaining a tolerable-noise amount $\sigma_G$ associated with the sampled electrical signal at a preset sampling point;

determining a maximum noise amount $\sigma_{max}$ associated with the electrical signal at the maximum level according to the following:

$\sigma_{max}=M\sigma_G$, wherein M represents the initial noise ratio parameter;

determining the minimum noise amount associated with the electrical signal at the minimum level is $\sigma_G$;

performing quantization between the maximum level and the minimum level to obtain N level values, wherein the N level values are all between the maximum level and the minimum level, and N is a positive integer;

determining N noise amounts respectively associated with the N level values according to a preset interpolation algorithm;

determining that the level amplitude of the sampled electrical signal is a first level value in the N level values; and obtaining a first noise amount associated with the first level value based on an association between the N level values and the N noise amounts.

4. The method according to claim 1, wherein obtaining the first noise amount associated with the sampled electrical signal comprises:

obtaining an association between a level amplitude and a noise amount based on the preset initial noise ratio parameter, the maximum noise amount, and the minimum noise amount, wherein the association between a level amplitude and a noise amount comprises a noise amount associated with each level amplitude that is greater than the minimum level and less than the maximum level; and searching the association between a level amplitude and a noise amount by using the level amplitude of the sampled electrical signal to obtain the first noise amount.

5. The method according to claim 1, wherein after performing the waveform sampling on the optical signal sent by the transmitter, the method further comprises:

performing time-domain equalization processing on the sampled electrical signal by using an equalizer, to obtain an equalized electrical signal.

6. The method according to claim 5, wherein obtaining the first noise amount associated with the sampled electrical signal comprises:

obtaining an equalization parameter associated with the equalizer, wherein the equalization parameter comprises a tap length of the equalizer and a tap coefficient of the equalizer; and obtaining the first noise amount associated with the equalized electrical signal based on the level amplitude of the sampled electrical signal, the equalization parameter, and the initial noise ratio parameter.

7. The method according to claim 6, wherein obtaining the first noise amount associated with the equalized electrical signal comprises:

obtaining an association between level amplitudes and noise amounts at consecutive sampling points based on the level amplitude of the sampled electrical signal, the equalization parameter, and the initial noise ratio parameter;

determining a third noise amount associated with the electrical signal at the maximum level and a fourth noise amount associated with the electrical signal at the minimum level based on the association between level amplitudes and noise amounts at consecutive sampling points;

modifying the initial noise ratio parameter based on the third noise amount and the fourth noise amount to obtain a modified noise ratio parameter;

obtaining a noise enhancement factor based on the equalization parameter, wherein the noise enhancement factor represents a noise enhancement degree of the equalizer; and obtaining the first noise amount associated with the equalized electrical signal based on the level amplitude of the sampled electrical signal, the modified noise ratio parameter, the noise enhancement factor, and an average optical power, wherein the average optical power is an average value of optical powers of the sampled electrical signal at different level amplitudes.

8. The method according to claim 7, wherein obtaining the first noise amount associated with the equalized electrical signal comprises:

determining the first noise amount $\sigma_{DUT\_estimated}$ associated with the equalized electrical signal according to the following:

$$\frac{1}{2}\left(\frac{\int f_u(y)\cdot Q\left(\frac{y-P_{th}}{M(y)\cdot C_{eq}\sigma_{DUT\_estimated}}\right)dy}{\int f_u(y)dy}\right)+$$

$$\frac{1}{2}\left(\frac{\int f_l(y)\cdot Q\left(\frac{P_{th}-y}{M(y)\cdot C_{eq}\sigma_{DUT\_estimated}}\right)dy}{\int f_l(y)dy}\right)=BER_{target}$$

wherein y represents a signal power collected at a sampling point at which the sampled electrical signal is located, $P_{th}$ represents the average optical power, $f_u(y)$ is amplitude distribution at a sampling point at which an optical power is greater than $P_{th}$, $f_l(y)$ is amplitude distribution at a sampling point at which an optical power is less than $P_{th}$, M(y) represents the modified noise ratio parameter, $C_{eq}$ is the noise enhancement factor, $BER_{target}$ is a bit error rate threshold, and Q represents a tail function with standard normal distribution.

9. The method according to claim 7, wherein obtaining the association between the level amplitudes and the noise amounts at consecutive sampling points based on the equalization parameter comprises:
determining P consecutive sampling points associated with P taps in the equalizer, wherein a value of P is a positive integer;
determining, in the following manner, a noise amount $noise_{eq}(n)$ that is at an $n^{th}$ sampling point and that exists after equalization:

$$noise_{eq}(n)=$$

$$\sqrt{\sum_{m=-\frac{P-1}{2}}^{\frac{P-1}{2}}|noise\,(n-m)\cdot h_{eq}(m)|^2+\sum_{\substack{m=-\frac{L-1}{2}\\m\notin[-\frac{P-1}{2},\frac{P-1}{2}]}}^{\frac{L-1}{2}}|\sigma_{average}\cdot h_{eq}(m)|^2}$$

wherein L represents the tap length of the equalizer, $h_{eq}$ represents the tap coefficient of the equalizer, noise(n−m) represents a noise amount that is at an (n−m)th sampling point and that exists before time-domain equalization processing is performed, and $\sigma_{average}$ is an average noise amount at different level amplitudes;
quantizing the level amplitude of the sampled electrical signal to obtain W levels, wherein W is a positive integer; and
obtaining the association between level amplitudes and noise amounts at consecutive sampling points based on the calculation manner of $noise_{eq}(n)$, wherein the association between level amplitudes and noise amounts at consecutive sampling points comprises WP noise amounts associated with level amplitudes at the P consecutive sampling points.

10. The method according to claim 1, wherein obtaining the second noise amount associated with the ideal electrical signal comprises:

determining the second noise amount $\sigma_{ideal\_estimated}$ associated with the ideal electrical signal according to the following:

$$\frac{1}{2}Q\left(\frac{y-P_{th}}{M\cdot\sigma_{ideal\_estimated}}\right)+\frac{1}{2}Q\left(\frac{P_{th}-y}{\sigma_{ideal\_estimated}}\right)=BER_{target}$$

wherein y represents a signal power collected at a sampling point at which the ideal electrical signal is located, $P_{th}$ represents an average optical power, which is an average value of optical powers of the ideal electrical signal at different level amplitudes, M represents the initial noise ratio parameter, $BER_{target}$ is a bit error rate threshold, and Q represents a tail function with standard normal distribution.

11. The method according to claim 1, further comprising: determining a transmitter and dispersion eye closure penalty by using the first noise amount and the second noise amount.

12. The method according to claim 11, wherein determining the transmitter and dispersion eye closure penalty by using the first noise amount and the second noise amount comprises:
determining the transmitter and dispersion eye closure penalty $TDEC_{calculated}$ in the following manner:

$$TDEC_{calculated}=\frac{\sigma_{DUT}}{\sigma_{ideal}}$$

wherein $\sigma_{DUT}$ represents the first noise amount, and $\sigma_{ideal}$ represents the second noise amount.

13. The method according to claim 11, further comprising:
in response to the bit error rate threshold being used, obtaining noise amounts respectively associated with the sampled electrical signal and the ideal electrical signal;
obtaining a modification relationship between a transmitter and dispersion eye closure penalty and a noise amount based on the noise amounts that are respectively associated with the sampled electrical signal and the ideal electrical signal and that are obtained in response to the bit error rate threshold being used; and
modifying the determined transmitter and dispersion eye closure penalty $TDEC_{calculated}$ according to the following:

$$TDEC_{actual}=TDEC_{calculated}f(TDEC_{actual},TDEC_{calculated})$$

wherein $TDEC_{actual}$ represents a modified transmitter and dispersion eye closure penalty, and $f(TDEC_{actual}, TDEC_{calculated})$ represents the modification relationship between a transmitter and dispersion eye closure penalty and a noise amount.

14. An apparatus for obtaining a transmitter test parameter, the apparatus comprising:
a processor, and
a memory coupled to the processor, having processor-executable instructions stored thereon, which are executed by the processor and cause the processor to:
perform waveform sampling on an optical signal sent by a transmitter, to obtain a sampled electrical signal,
obtain a first noise amount associated with the sampled electrical signal based on a preset initial noise ratio parameter and a level amplitude of the sampled electrical signal, wherein the level amplitude of the sampled electrical signal is greater than a minimum level and less than a maximum level, wherein the initial noise ratio parameter is a ratio of a maximum noise amount to a minimum noise amount, wherein the maximum noise amount is a noise amount associated with an electrical signal at the maximum level, wherein the minimum noise amount is a noise amount associated with an electrical signal at the minimum level, and wherein the first noise amount is a noise amount that is greater than the minimum noise amount and less than the maximum noise amount; and obtain a second noise amount associated with an ideal electrical signal based on the initial noise ratio parameter, a first level amplitude of the ideal electrical signal and a second level amplitude of the ideal electrical signal, wherein an optical modulation amplitude of the ideal electrical signal equals to the optical modulation amplitude of the sampled electrical signal, wherein the first level amplitude of the ideal electrical signal is the maximum level, the second level amplitude of the ideal electrical signal is the minimum level, and wherein the first noise amount and the second noise amount are used to perform a consistency test on the transmitter.

15. The apparatus according to claim 14, wherein the processor is further configured to:

determine that the level amplitude of the sampled electrical signal is between the maximum level and the minimum level; and use the maximum noise amount and the minimum noise amount as an interpolation condition, and perform interpolation calculation on the level amplitude of the sampled electrical signal based on the initial noise ratio parameter to obtain the first noise amount.

16. The apparatus according to claim 15, wherein the processor is further configured to:

obtain a tolerable-noise amount $\sigma_G$ of the sampled electrical signal at a preset sampling point;

determine maximum noise amount $\sigma_{max}$ associated with the electrical signal at the maximum level in the following manner: $\sigma_{max} = M\sigma_G$, wherein M represents the initial noise ratio parameter;

determine the minimum noise amount associated with the electrical signal at the minimum level is $\sigma_G$;

perform quantization between the maximum level and the minimum level to obtain N level values, wherein the N level values are all between the maximum level and the minimum level, and N is a positive integer;

determine N noise amounts respectively associated with the N level values according to a preset interpolation algorithm;

determine that the level amplitude of the sampled electrical signal is a first level value in the N level values; and obtain a first noise amount associated with the first level value based on an association between the N level values and the N noise amounts.

17. The apparatus according to claim 14, wherein the processor is further configured to:

obtain an association between a level amplitude and a noise amount based on the preset initial noise ratio parameter, the maximum noise amount, and the minimum noise amount, wherein the association between a level amplitude and a noise amount comprises a noise amount associated with each level amplitude that is greater than the minimum level and less than the maximum level; and search the association between a level amplitude and a noise amount by using the level amplitude of the sampled electrical signal to obtain the first noise amount.

18. The apparatus according to claim 14, wherein the processor is further configured to:

after performing waveform sampling on the optical signal to obtain the sampled electrical signal, perform time-domain equalization processing on the sampled electrical signal by using an equalizer to obtain an equalized electrical signal.

19. The apparatus according to claim 18, wherein the processor is further configured to:

obtain an equalization parameter associated with the equalizer, wherein the equalization parameter comprises a tap length of the equalizer and a tap coefficient of the equalizer; and obtain a first noise amount associated with the equalized electrical signal based on the level amplitude of the sampled electrical signal, the equalization parameter, and the initial noise ratio parameter.

20. The apparatus according to claim 19, wherein the processor is further configured to:

obtain an association between level amplitudes and noise amounts at consecutive sampling points based on the level amplitude of the sampled electrical signal, the equalization parameter, and the initial noise ratio parameter;

determine a third noise amount associated with the electrical signal at the maximum level and a fourth noise amount associated with the electrical signal at the minimum level based on the association between level amplitudes and noise amounts at consecutive sampling points;

modify the initial noise ratio parameter based on the third noise amount and the fourth noise amount to obtain a modified noise ratio parameter;

obtain a noise enhancement factor based on the equalization parameter, wherein the noise enhancement factor represent a noise enhancement degree of the equalizer; and obtain the first noise amount associated with the equalized electrical signal based on the level amplitude of the sampled electrical signal, the modified noise ratio parameter, the noise enhancement factor, and an average optical power, wherein the average optical power is an average value of optical powers of the sampled electrical signal at different level amplitudes.

\* \* \* \* \*